(12) United States Patent
Wengerter et al.

(10) Patent No.: US 8,681,729 B2
(45) Date of Patent: Mar. 25, 2014

(54) RESOURCE RESERVATION FOR USERS IN A MOBILE COMMUNICATION SYSTEM

(75) Inventors: Christian Wengerter, Langen (DE);
Joachim Löhr, Langen (DE);
Alexander Golitschek Edler Von Elbwart, Langen (DE)

(73) Assignee: Panasonic Corporation, Osaka (JP)

( * ) Notice: Subject to any disclaimer, the term of this patent is extended or adjusted under 35 U.S.C. 154(b) by 1401 days.

(21) Appl. No.: 12/300,607

(22) PCT Filed: Feb. 7, 2007

(86) PCT No.: PCT/EP2007/001043
§ 371 (c)(1),
(2), (4) Date: Feb. 27, 2009

(87) PCT Pub. No.: WO2007/131558
PCT Pub. Date: Nov. 22, 2007

(65) Prior Publication Data
US 2009/0262699 A1    Oct. 22, 2009

(30) Foreign Application Priority Data
May 12, 2006 (EP) .................................. 06009854

(51) Int. Cl.
*H04W 4/00* (2009.01)
*H04J 4/00* (2006.01)
(52) U.S. Cl.
USPC ............................ 370/330; 370/329; 370/478
(58) Field of Classification Search
USPC ......................................................... 370/330
See application file for complete search history.

(56) References Cited

U.S. PATENT DOCUMENTS

| | | | |
|---|---|---|---|
| 6,898,195 B1 * | 5/2005 | Molno et al. | 370/329 |
| 2001/0004362 A1 * | 6/2001 | Kamiya | 370/416 |
| 2001/0030956 A1 * | 10/2001 | Chillariga et al. | 370/348 |
| 2003/0021245 A1 * | 1/2003 | Haumonte et al. | 370/330 |
| 2004/0228317 A1 * | 11/2004 | Tolli et al. | 370/345 |
| 2008/0259895 A1 * | 10/2008 | Habetha et al. | 370/345 |

FOREIGN PATENT DOCUMENTS

EP    1 306 985    5/2003
WO    01/33742    5/2001

OTHER PUBLICATIONS

International Search Report dated Apr. 10, 2007.
European Search Report dated Nov. 10, 2006.
C. Werngerter, et al., "Fairness and Throughput Analysis for Generalized Proportional Fair Frequency Scheduling in OFDMA," IEEE, 2005, pp. 1-5.

(Continued)

*Primary Examiner* — Shripal Khajuria
(74) *Attorney, Agent, or Firm* — Dickinson Wright PLLC

(57) ABSTRACT

The invention relates to a method and scheduling apparatus for reserving radio resources in radio resource block units in a mobile communication system for a plurality of users. Further, another aspect of the invention is the indication of a radio resource reservation in radio resource block units in a mobile communication system to one of a plurality of mobile terminals. To provide a new mechanism allowing an efficient utilization of radio resources the invention proposes a resource reservation mechanism that reserves radio resources for a plurality of users in resource block units. Thereby, individual resource blocks are reserved for the individual users for a reservation period that comprises a plurality of time slots (or sub-frames). Further, the resource block reservations for the users overlap at least partially among the users, i.e. individual ones of the resource blocks are reserved for plural users.

18 Claims, 14 Drawing Sheets

(56) References Cited

OTHER PUBLICATIONS

A. Nishio, et al., "Comparison of Scheduling Schemes for VoIP Transmission in E-UTRA," Panasonic Corporation, Mar. 17-20, 2009, p. 458, with English translation.

3GPP TR 28.814 V1.2.2, "$3^{rd}$ Generation Partnership Project; Technical Specification Group Radio Access Network; Physical Layer Aspects for Evolved UTRA (Release 7)," Mar. 2006, pp. 1-104.

3GPP TS 25.212 V7.0.0, "$3^{rd}$ Generation Partnership Project; Technical Specification Group Radio, Access Network; Multiplexing and channel coding (FDD) (Release 7)," Mar. 2006, pp. 1-84.

3GPP TSG-RAN WG1 #44, "Further details on HS-SCCH-less operation for VoIP traffic," Qualcomm Europe, R1-060450, Feb. 13-17, 2006, pp. 1-7.

3GPP TSG-RAN WG1 #44bis, "Further Evaluation of HS-SCCH-less operation," Qualcomm Europe, R1-060944, Mar. 27-31, 2006, pp. 1-8.

\* cited by examiner

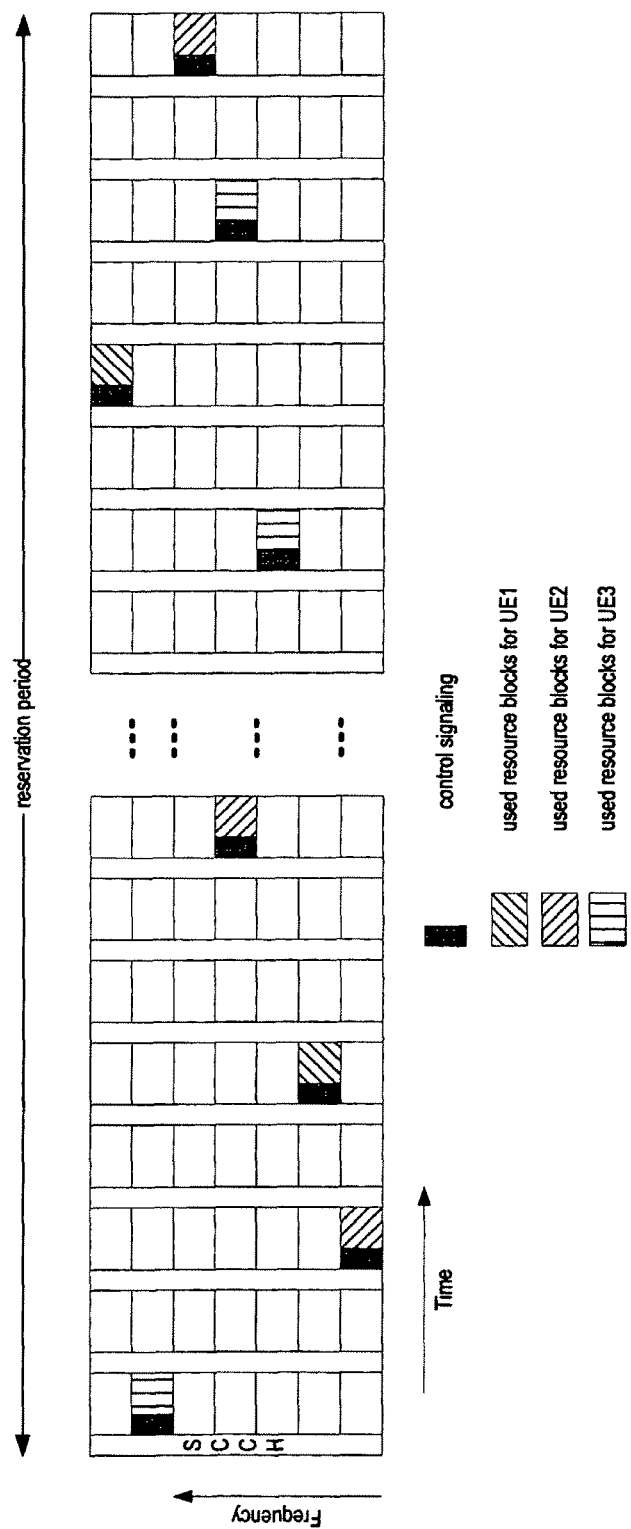

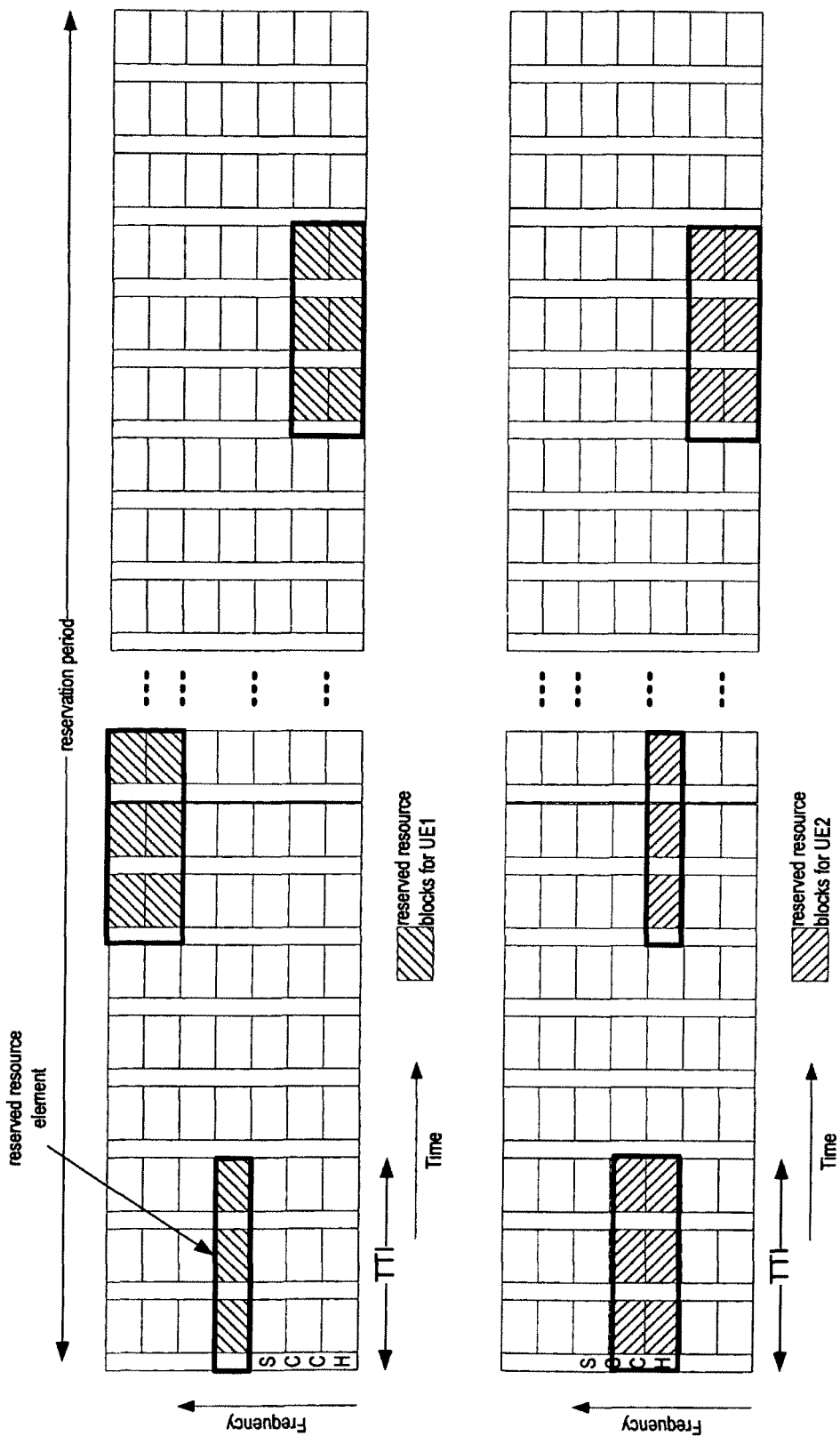

RESOURCE RESERVATION FOR USERS IN A MOBILE COMMUNICATION SYSTEM

FIELD OF THE INVENTION

The invention relates to a method and scheduling apparatus for reserving radio resources in radio resource block units in a mobile communication system for a plurality of users. Further, another aspect of the invention is the indication of a radio resource reservation in radio resource block units in a mobile communication system to one of a plurality of mobile terminals.

TECHNICAL BACKGROUND

Packet-Scheduling and Shared Channel Transmission

In wireless communication systems employing packet-scheduling, at least part of the air-interface resources are assigned dynamically to different users (mobile stations—MS). Those dynamically allocated resources are typically mapped to at least one shared data channel (SDCH). A shared data channel may for example have one of the following configurations:

- One or multiple codes in a CDMA (Code Division Multiple Access) system are dynamically shared between multiple MS.
- One or multiple subcarriers (subbands) in an OFDMA (Orthogonal Frequency Division Multiple Access) system are dynamically shared between multiple MS.
- Combinations of the above in an OFCDMA (Orthogonal Frequency Code Division Multiplex Access) or a MC-CDMA (Multi Carrier-Code Division Multiple Access) system are dynamically shared between multiple MS.

FIG. 1 shows a packet-scheduling system on a shared channel for systems with a single shared data channel. A time slot (also referred to as a subframe or PHY Frame herein) reflects the smallest interval at which the scheduler (e.g. the Physical Layer or MAC Layer Scheduler) performs the dynamic resource allocation (DRA). Further, typically the smallest unit of radio resources (referred to as a resource block herein), which can be allocated in OFDM systems, is defined by one time slot in time domain and by one subcarrier/subband in the frequency domain. Similarly, in a CDMA system this smallest unit of radio resources is defined by a time slot in the time domain and a code in the code domain. In OFCDMA or MC-CDMA systems, this smallest unit is defined by one time slot in time domain, by one subcarrier/subband in the frequency domain and one code in the code domain. Note that dynamic resource allocation may be performed in time domain and in code/frequency domain.

The main benefits of packet-scheduling are the multi-user diversity gain by time domain scheduling (TDS) and dynamic user rate adaption.

Assuming that the channel conditions of the users change over time due to fast (and slow) fading, at a given time instant the scheduler can assign available resources (codes in case of CDMA, subcarriers/subbands in case of OFDMA) to users having good channel conditions in time domain scheduling. For explanatory reasons, the following sections will mainly concentrate on OFDMA downlink transmission.

Specifics of DRA and Shared Channel Transmission in OFDMA

Additionally to exploiting multi-user diversity in time domain by TDS, in OFDMA multi-user diversity can also be exploited in frequency domain by FDS (Frequency Domain Scheduling). This is because the OFDM signal is in frequency domain constructed out of multiple narrowband subcarriers (typically grouped into subbands), which can be assigned dynamically to different users. By this, the frequency selective channel properties due to multi-path propagation can be exploited to schedule users on frequencies (subcarriers/subbands) on which they have a good channel quality (multi-user diversity in frequency domain).

For practical reasons in an OFDMA system the bandwidth is divided into multiple subbands, which consist out of multiple subcarriers. I.e. the smallest unit on which a user may be allocated would have a bandwidth of one subband and a duration of one time slot (which may correspond to multiple OFDM symbols), which is denoted as a RB (Resource Block). Typically a subband consists of consecutive subcarriers, however in some case it is desired to form a subband out of distributed non-consecutive subcarriers. A scheduler may also allocate a user over multiple consecutive or non-consecutive subbands and/or time slots.

E.g. for the 3GPP Long Term Evolution (see 3GPP TR 25.814: "Physical Layer Aspects for Evolved UTRA", Release 7, v. 1.2.2, March 2006—available at http://www.3gpp.org), a 10 MHz system may consist out of 600 subcarriers with a subcarrier spacing of 15 kHz, which may then be grouped into 24 subbands (a 25 subcarriers) with each subband occupying a bandwidth of 375 kHz. Assuming, that a time slot has a duration of 0.5 ms, then a resource block would span over 375 kHz and 0.5 ms.

In order to exploit multi-user diversity and to achieve scheduling gain in frequency domain, the data for a given user should be allocated on resource blocks on which the users have a good channel condition. Typically, those resource blocks are close to each other and therefore, this transmission mode is in also denoted as localized mode (LM). An example for a localized mode channel structure is shown in FIG. 2. In this example neighboring resource blocks are assigned to four mobile stations (MS1 to MS4) in the time domain and frequency domain. For exemplary purposes it is also assumed that in the "gaps" between the different resource blocks in the time domain, Layer 1 and/or Layer 2 control signaling is transmitted.

In contrast to the localized mode, in OFDMA the resources may also be allocated in a distributed manner in frequency domain, in the following denoted as distributed mode (DM). The distributed mode may be implemented in different ways:

- A user (codeblock) is allocated on multiple distributed resource blocks
- A user (codeblock) is allocated on multiple distributed subcarriers or modulation symbols belonging to resource blocks, where the resource blocks are shared by multiple distributed mode users.
- A user (codeblock) is allocated on multiple distributed subcarriers or modulation symbols, which are punctured into a resource block used also for localized mode.

The transmission in distributed mode is generally used to obtain frequency diversity (in contrast to multi-user diversity for localized mode) and, hence, may be useful in the following cases:

- The channel quality to the mobile stations (receivers) of the resource blocks is not known sufficiently well at the base station (transmitter), e.g. due to limited or poor CQI (Channel Quality Indicator) feedback and/or due to outdated CQI feedback (e.g. due to high Doppler frequency).
- The data to be transmitted is delay critical and the transmission should be made robust In localized mode as well as in distributed mode in a given time slot multiple codeblocks (which are referred to as transport-blocks in 3GPP terminology) may be allocated separately to the same user on different resource blocks, which may or may not belong to the same service or ARQ process. Logically, this can be understood as allocating different users.

Link Adaptation (LA) Techniques

In order to efficiently utilize the benefits from scheduling, usually it is combined with fast LA (Link Adaptation) techniques such as AMC (Adaptive Modulation and Coding) and ARQ (Automatic Repeat reQuest). Additionally, fast and/or slow power control may be applied.

Employing adaptive modulation and coding (AMC), the data-rate per codeblock (in case a codeblock spans over multiple resource blocks, the AMC may alternatively be performed per resource block) for a scheduled user is adapted dynamically to the instantaneous channel quality of the respective allocated resource by changing the MCS (Modulation and Coding Scheme). Naturally, this requires a channel quality estimate at the transmitter for the link to the respective receiver.

Shared Channel Related Control Signaling

In order to inform the scheduled users about their allocation status, transmission format and data related parameters Layer 1 and Layer 2 control signaling is typically transmitted along with one or multiple shared data channels (SDCHs).

In 3GPP HSDPA (CDMA) the Layer 1/Layer 2 control signaling is transmitted on multiple shared control channels (SCCHs) on a transmission time interval (TTI)-basis (a TTI may thereby correspond to a time slot in its length). Each transmitted shared control channel carries for example information for one scheduled user, such as channelization-code-set, modulation scheme, transport-block size information, redundancy and constellation version, HARQ process information, new data indicator (similar to a HARQ sequence number) and user identity (see e.g. 3GPP TS 25.212: "Multiplexing and channel coding (FDD)", Release 7, v.7.0.0, March 2006, available at http://www.3gpp.org).

Generally, the information sent via Layer 1/Layer 2 control signaling may be separated into two categories, shared control information (SCI) and dedicated control information (DCI). The shared control information part of the Layer 1/Layer 2 control signaling contains information related to the resource allocation and it should therefore be possible for all users to decode the shared control information. It typically contains the following information:

User identity

RB allocation information

Depending on the setup of other channels and the setup of the dedicated control information, the shared control information may additionally contain information such as ACK/NACK for uplink transmission, MIMO related information, uplink scheduling information, information on the dedicated control information (resource, MCS, etc.).

The dedicated control information part of the Layer 1/Layer 2 control signaling contains information related to the transmission format and to the transmitted data to a specific scheduled user. I.e. the dedicated control information needs only to be decoded by the scheduled user. The dedicated control information typically contains information on the transmission format:

Modulation scheme

Transport-block size (or coding rate)

Depending on the overall channel configuration, depending on the shared control information format and depending on the HARQ setup it may additionally contain information such as HARQ related information (e.g. HARQ process information, redundancy and constellation version, new data indicator), MIMO related information.

Layer 1/Layer 2 control signaling may be transmitted in various formats. One option is joint encoding of shared control information and dedicated control information. Thereby, shared control information and dedicated control information for multiple users (codeblocks) are encoded jointly or the shared control information and dedicated control information are encoded jointly for a single user (codeblock) and are transmitted separately per user (codeblock).

Another option is the separate encoding of shared control information and dedicated control information. Thereby, the shared control information for multiple users (codeblocks) are encoded jointly or the shared control information is encoded per user (codeblocks). Similarly, the dedicated control information for multiple users (codeblocks) is encoded jointly or the dedicated control information is encoded per user (codeblocks).

In case of having multiple shared control information codeblocks (each shared control information codeblock may contain shared control information for multiple users), the shared control information codeblocks may be transmitted with different power, modulation, coding schemes and/or code rates.

From a logical point of view, the Layer 1/Layer 2 control signaling contained out of shared control information and dedicated control information may be seen e.g. as follows:

A single (shared) control channel with two parts (shared control information and dedicated control information)

A single (shared) control channel (carrying only shared control information), where the dedicated control information is not considered a separate control channel, but part of the shared data channel, i.e. mapped together with the data (same RB)

Two separate control channels (shared control information, dedicated control information)

Multiple separate control channels, e.g.:

Single shared control channel carrying shared control information and multiple dedicated control channels carrying dedicated control information Multiple shared control channels carrying shared control information and multiple dedicated control channels carrying dedicated control information Multiple shared control channels carrying shared control information, where the dedicated control information is not a separate control channel, but part of the shared data channel, i.e. mapped together with the data (same RB)

Typically, both the shared control information and the dedicated control information is mapped separately from the shared data channel into the physical resources as shown in FIG. 2, which may also been called shared control channel. Alternatively, the dedicated control information may be mapped into the resources allocated for the shared data channel as shown in FIG. 3. In FIG. 3, a part of individual resource blocks is reserved for dedicated control information.

Low-Rate Data Services

In case data packets for a low rate service have to be transmitted with low delay, one ends up in transmitting small data packets, with a strict delay requirement (e.g. VoIP, gaming, TCP ACK/NACK, higher layer signaling, paging messages, small configuration messages (Timing Advance, ARQ ACK/NACK)). In this case, the required Layer 1/Layer 2 control signaling overhead would be significant (on the order or even larger than the data itself), which may cause the following problems:

The resources available for data transmission are significantly reduced due to large Layer 1/Layer 2 control signaling overhead The Layer 1/Layer 2 control signaling can only signal a maximum number of N users at a time, which would not be sufficient to utilize all available resources for data.

Both will lead to inefficient utilization of radio resources.

SUMMARY OF THE INVENTION

The object of the invention is to suggest a new mechanism allowing an efficient utilization of radio resources.

The object is solved by the subject matter of the independent claims. Advantageous embodiments of the invention are subject matters of the dependent claims.

One main aspect of the invention is to reserve radio resources for a plurality of users in resource block units. Thereby, individual resource blocks are reserved for the individual users for a reservation period that comprises a plurality of time slots (or sub-frames). Further, the resource block reservations for the users overlap at least partially among the users, i.e. individual ones of the resource blocks are reserved for plural users.

Another aspect of the invention is the provision of a new structure of resource blocks that may be reserved for plural users simultaneously and that may used for transport of data destined to plural users.

According to one embodiment of the invention, a method for reserving radio resources in radio resource block units in a mobile communication system for a plurality of users is provided. Herein, each resource block is associated to a portion of an available frequency resource in the frequency domain and to a time slot in the time domain. Optionally, each resource block is further associated to a code in the code domain. According to this embodiment, resource blocks for the plurality of users are reserved for downlink data transmission to the users for a reservation period comprising of a plurality consecutive of time slots. Thereby, at least one resource block that is reserved for an individual one of the plurality users is also reserved for another user.

Consequently the resource blocks reserved to the users at least partially overlap. However, there may also be situations where the resource blocks reserved for a first user and the resource blocks reserved for a second user of the plurality of users are identical.

There may exist different rules to obey for the reservation of resource blocks. For example, in one embodiment of the invention, multiple resource blocks may be reserved for a user within a single time slot of the reservation period. Alternatively or in addition thereto, at least one resource block in each of a number of consecutive time slots may be for a user. Another embodiment of the invention foresees that distinct time slots in which resource blocks are reserved for a user are spaced by at least one time slot in which no resource block is reserved for this user.

In a further embodiment of the invention, a transmitting entity may transmit a downlink configuration message indicating which of the plurality of resource blocks is reserved for which user or users of the plurality of users.

The reserved resource blocks within a reservation period may be regarded to form a reservation pattern in at least the time and frequency domain (optionally the pattern further includes the code domain). In one embodiment of the invention, reservation of resource blocks is valid for a given or configurable number of consecutive time slots forming the reservation period.

For example, the reservation period may thus comprise plural time slots or in some cased even an infinite number of time slots. In other words, according to a further embodiment, the reservation of resource blocks is valid for a given or configurable time period and/or until the update of the resource reservation due to a configuration message updating the reservation of resource blocks.

To indicate the reservation pattern to use to the user, a configuration message indicating the reservation pattern in at least the time and frequency domain may be transmitted to the users, according to an exemplary embodiment of the invention. This configuration message may for example be transmitted through a dedicated channel, a broadcast channel or a multicast channel to individual, a group of or all users in a service area.

Another embodiment of the invention foresees that a part of the available radio resources is reserved for the plurality of users on a reservation period basis as described above, while a remaining part of the radio resources is assigned to users scheduled on a transmission time interval basis. Hence, it may be foreseen that some radio resources in the service area are persistently reserved for users for longer time periods, while other radio resources are allocated on a transmission time interval basis, i.e. at a high frequency compared to the scheduling of reserved radio resources.

Accordingly, another embodiment of the invention foresees the scheduling of downlink transmissions to users, including the plurality of users that are subject to resource reservation, on a per transmission time interval basis. If no data are scheduled for transmission within a resource block reserved for at least one user of said plurality of users for a reservation period, the unscheduled resources of the resource block to may be assigned to another user on a per transmission time interval basis, i.e. the reservation is temporarily released to transmission time interval based scheduling.

An alternative embodiment of the invention proposes to schedule users on a transmission interval basis, wherein the scheduling assigns at least one resource block to a user that has been reserved for at least one other user.

The advantage of the operation according to these two embodiments above may be seen in the obtained flexibility of scheduler in reserving/allocating resources while being able to reduce the scheduling related control signaling. On the one hand, when reserving resources for users, less or no additional associated control signaling indicating the reservations may be needed, especially, if the reservations are valid for longer periods of time compared to the scheduling on transmission time interval basis. On the other hand, the scheduler still has the opportunity to "ignore" reservations and to schedule reserved resources on a transmission time interval basis, for example to react to a sudden requirement for high transmission power/rates/bandwidth to be allocated to some users.

A related idea according to another embodiment of the invention foresees that multiple resource blocks in a time slot are reserved for least one user of the plurality of user. However, only a given or configurable maximum number of these multiple reserved resource blocks in the time slot are (de facto) used for downlink data transmission to the at least one user or plurality of users. It may thus be advantageous that a scheduler schedules at least one other user on a transmission time interval basis thereby assigning the remaining number of reserved resource blocks in the time slot to said at least one other user.

As some of the reserved resource block may be reserved for multiple users simultaneously, different mechanism may be employed for using the reserved resource blocks for downlink transmission to the users. One exemplary embodiment of the invention uses a strategy where user data are transmitted to a single user in a resource block that has been reserved for multiple users. An alternative embodiment of the invention proposes that data is destined to at least two of the multiple users within a single reserved resource block.

Another embodiment of the invention provides a scheduling apparatus for reserving radio resources in radio resource block units in a mobile communication system for a plurality of users. The scheduling apparatus comprises a scheduler for reserving resource blocks for the plurality of users for downlink data transmission to the users for a reservation period comprising of a plurality consecutive of time slots. Thereby, at least one resource block reserved for an individual one of the plurality users is also reserved for another user.

A further embodiment of the invention provides a scheduling apparatus that is operable to perform the steps of the method for reserving radio resources according to one of the various embodiments above. In other embodiments of the invention the scheduling apparatus according to the two embodiments above may be comprised in a base station or mobile communication system.

A further embodiment of the invention provides a computer-readable medium storing instructions that, when executed by the processor of a scheduling apparatus, cause the scheduling apparatus to reserve radio resources in radio resource block units in a mobile communication system for a plurality of users, by reserving resource blocks for the plurality of users for downlink data transmission to the users for a reservation period comprising of a plurality consecutive of time slots, wherein at least one resource block reserved for an individual one of the plurality users is also reserved for another user.

A further embodiment relates to a computer-readable medium further storing instructions that, when executed by the processor, cause the processor to perform the steps of the method for reserving radio resources according to one of the various embodiments above.

Another embodiment relates to a method for indicating a radio resource reservation in radio resource block units in a mobile communication system to one of a plurality of mobile terminals. A mobile terminal of the plurality of mobile terminals may receive a configuration message indicating a reservation pattern of resource blocks reserved for the mobile terminal within a reservation period. According to the method, at least one of the resource blocks reserved for the mobile terminal is also reserved for another mobile terminal of the plurality of mobile terminals.

In a further embodiment of the invention, the mobile terminal may receive data transported in each of the resource blocks reserved for at least said mobile terminal, and may subsequently attempt to decode the data in the reserved resource blocks. If the data is not decoded successfully, the mobile terminal may simply ignore the received data.

In an alternative embodiment of the invention the mobile terminal may receive data transported in each of the resource blocks reserved for at least this mobile terminal. The mobile terminal may decode associated control signaling from the received data in the respective resource block. The control signaling is associated to a respective resource block and allows the mobile terminal to determine whether user data comprised in the received data of the respective resource block is destined to the mobile terminal or not. The associated control signaling may additionally indicate the exact transport format of the transmitted data or a restricted set of possibly used transport formats. If the user data is destined to the mobile terminal, it decodes the user data destined to the mobile terminal from the data received in the respective resource block.

In a variation of this embodiment, the mobile terminal buffers the user data destined to the mobile terminal for soft combination with other data, if the user data is not decoded successfully.

In a further variation of this embodiment, at least one of the resource blocks reserved for at least the mobile terminal comprises user data for the mobile terminal and at least one other mobile terminal. The mobile terminal may demultiplex the user data destined to the mobile terminals based on the control signaling.

In an alternative embodiment of the invention multiple resource blocks are reserved for the mobile terminal within a time slot. The mobile terminal receives data transported in each of the multiple resource blocks reserved for at least said mobile terminal. The mobile terminal attempts to decode the received data of an individual resource blocks, and, if the mobile terminal has been able to successfully decode data destined to him in a given or configurable maximum number of said multiple reserved resource blocks in the time slot, the mobile terminal aborts the reception of data in the multiple reserved resource blocks.

In a variation of this embodiment, the mobile terminal determines that data in a received resource block is destined to him, by either successfully decoding the received data in the resource block or based on control signaling associated to the respective received resource block.

A further alternative embodiment of the invention the mobile terminal receives data transported in each of the resource blocks reserved for at least this mobile terminal. The terminal tries to decode the received data by performing a blind detection based on the received data that has been optionally combined with data received earlier. Moreover, the mobile terminal will buffer, and the received data, if the received data cannot be decoded successfully.

In another embodiment of the invention, a retransmission scheme is used for retransmitting data of resource blocks, wherein retransmissions are transmitted in a synchronous fashion.

A further embodiment of the invention proposes the use of a HARQ scheme for retransmitting data of resource blocks. In this exemplary embodiment, the initial transmission of data in a resource block may only be transmitted in specifically chosen or configured resource blocks of the reserved resource blocks.

Other embodiments of the invention relate to a mobile terminal capable of performing the steps of the method for receiving an indication on a radio resource reservation according to the different embodiments of the invention described above. In one exemplary embodiment, the mobile terminal comprises a receiver for receiving a configuration message indicating a reservation pattern of resource blocks reserved for the mobile terminal within a reservation period, wherein at least one of the resource blocks reserved for the mobile terminal is also reserved for another mobile terminal of the plurality of mobile terminals.

Further, the invention according to one embodiment provides a computer-readable medium storing instructions that, when executed by a processor of a mobile terminal, cause the mobile terminal to receive an indication on a radio resource reservation in radio resource block units in a mobile communication system, by receiving a configuration message indicating a reservation pattern of resource blocks reserved for the mobile terminal within a reservation period. Thereby, at least one of the resource blocks reserved for the mobile terminal is also reserved for another mobile terminal of the plurality of mobile terminals.

In another embodiment of the invention a computer readable medium stores instructions that, when executed by the processor, cause the mobile terminal to perform the steps of the method for receiving an indication on a radio resource reservation according to the different embodiments of the invention described above.

A further embodiment of the invention relates to a mobile communication system in which radio resources are reserved in radio resource block units for a plurality of users for a reservation period comprising of a plurality consecutive of time slots. Thereby, at least one resource block reserved for an individual one of the plurality users is also reserved for another user.

In a variation of the embodiment of the invention radio resources may be additionally assigned in radio resource block units to a plurality of users on a transmission time interval basis. A further improvement foresees that only selected ones of the resource blocks reserved for at least one user are used for transmitting an initial transmission of downlink data to a user.

BRIEF DESCRIPTION OF THE FIGURES

In the following the invention is described in more detail in reference to the attached figures and drawings. Similar or corresponding details in the figures are marked with the same reference numerals.

FIG. 13 shows an exemplary combination of control signaling and user data in reserved resource blocks according to an exemplary embodiment of the invention, and FIG. 14 a resource reservation of resource elements in the system according to a further exemplary embodiment of the invention.

DETAILED DESCRIPTION OF THE INVENTION

Figure 1:
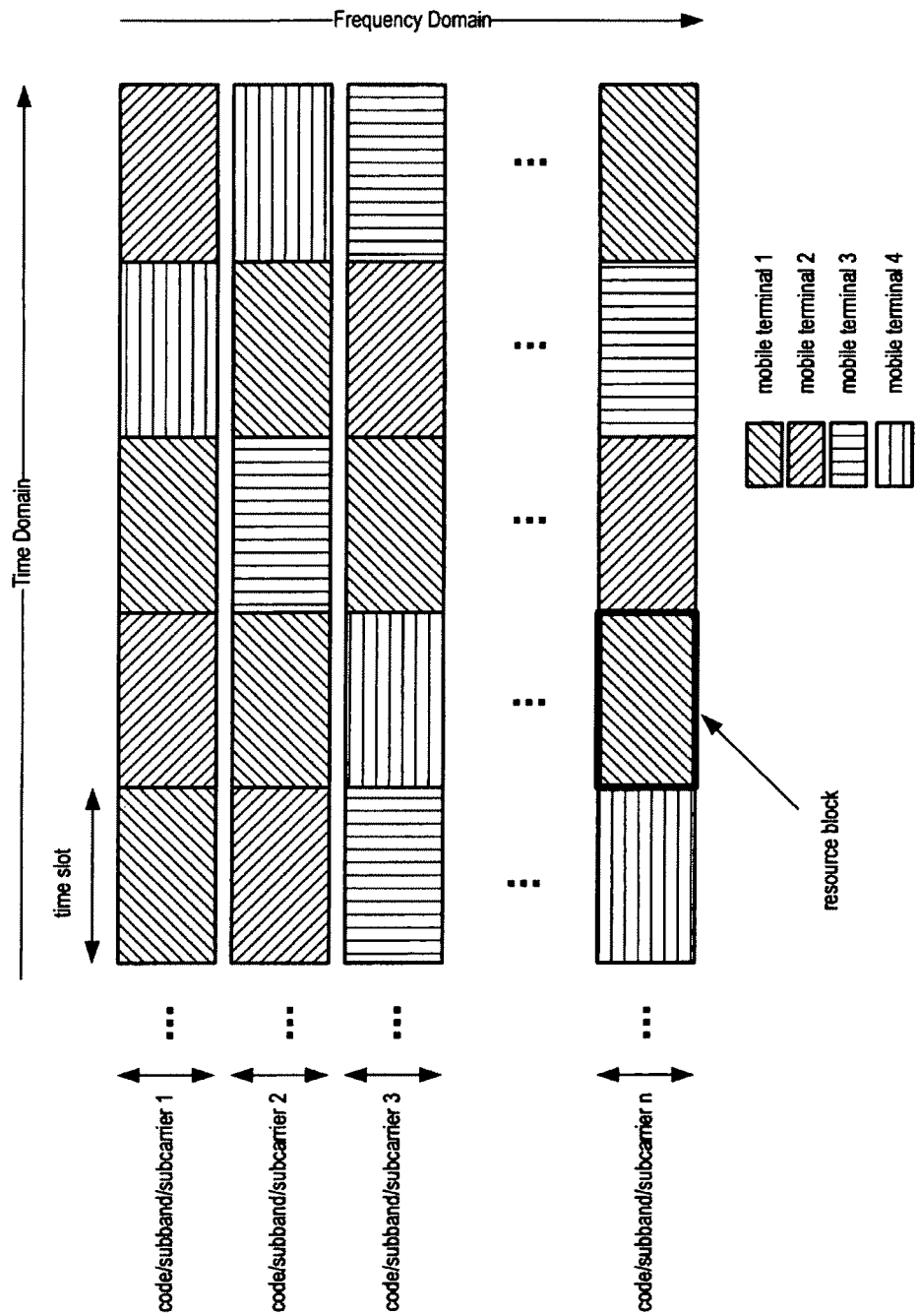
FIG. 1 shows an exemplary channel structure of an OFDMA system and a dynamic allocation of radio resources on a transmission time interval basis to different users.
Figure 2:
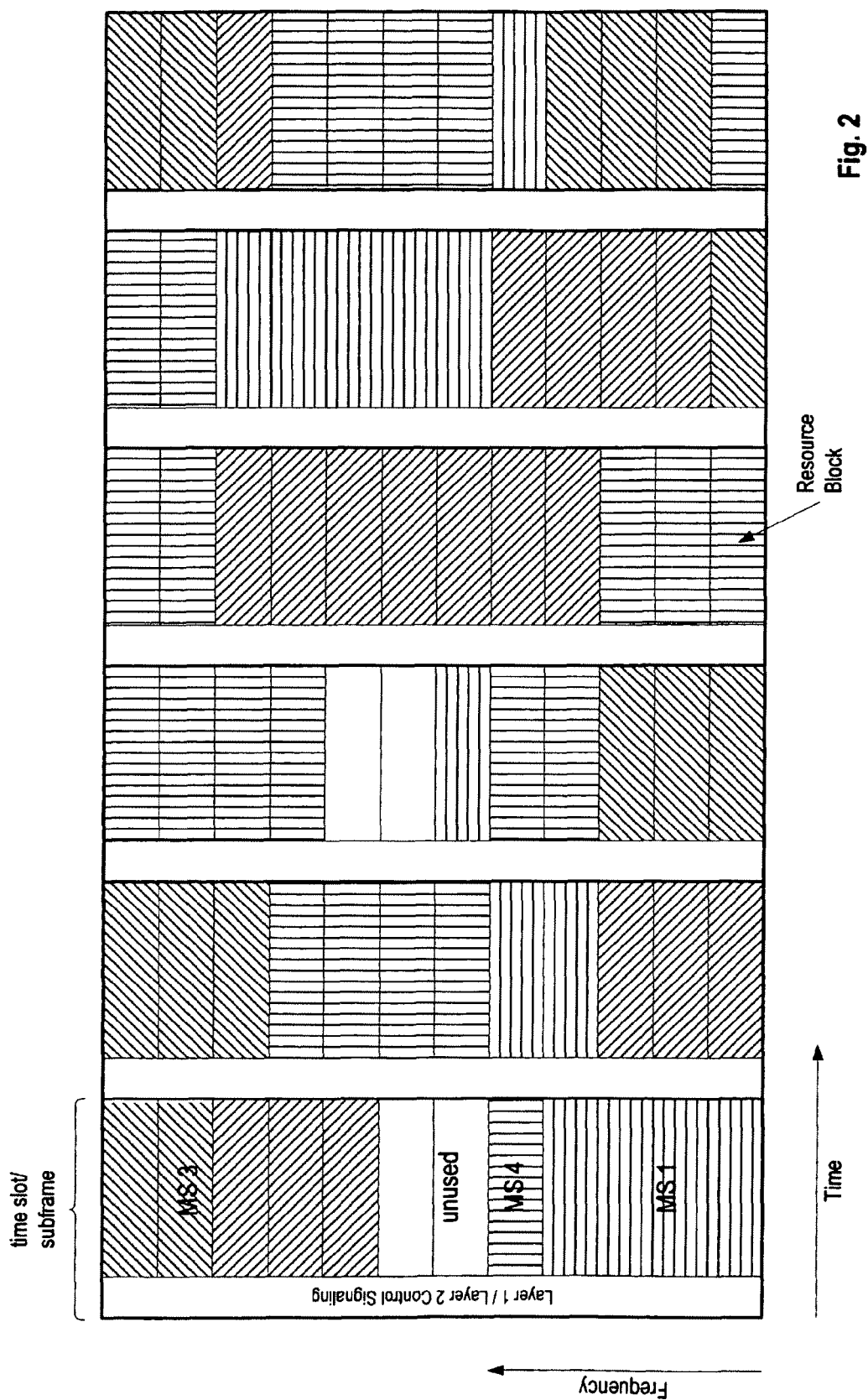
FIG. 2 shows an exemplary allocation of radio resources to users in an OFDMA system in localized mode (LM)
Figure 3:
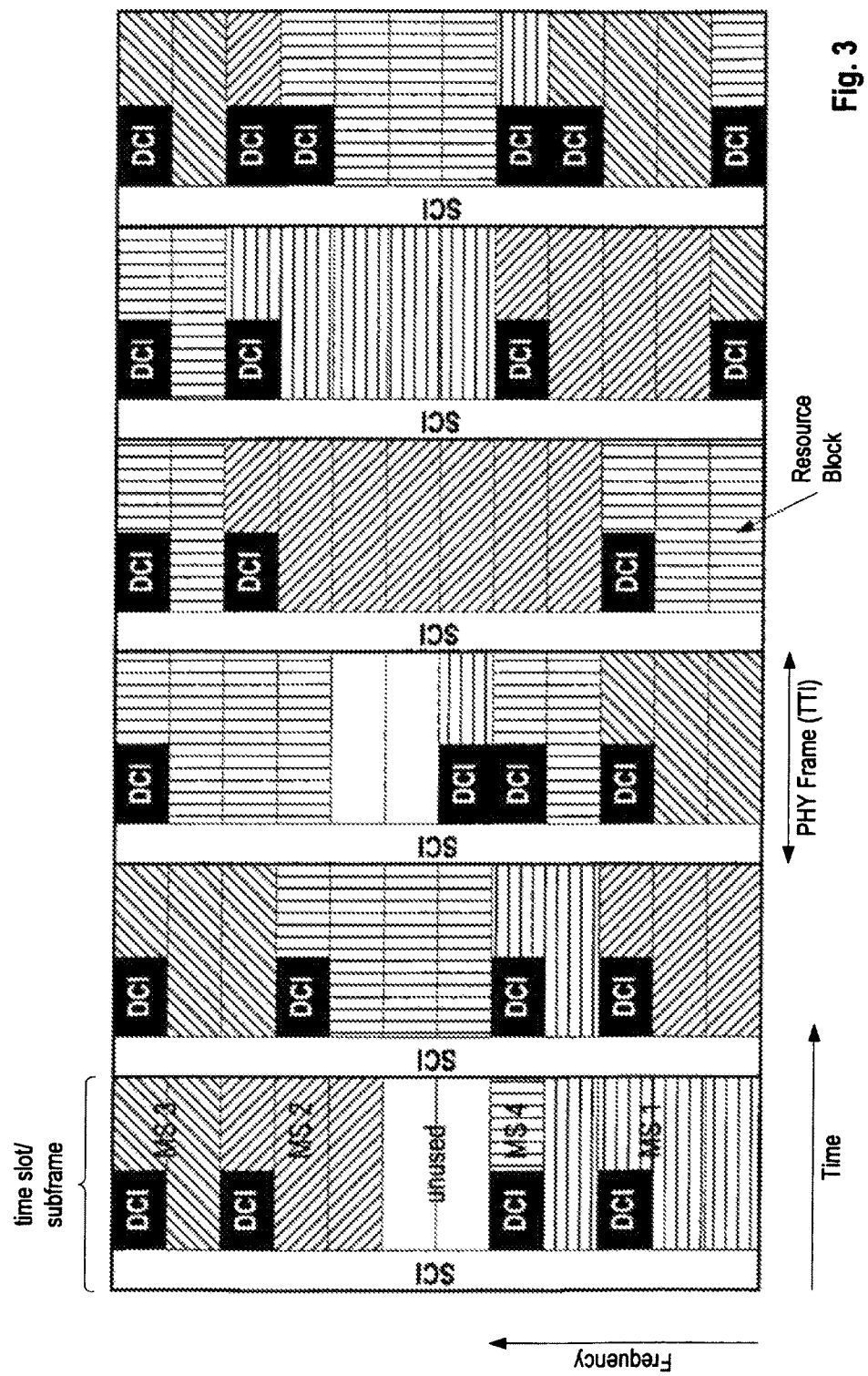
FIG. 3 shows the signaling of control information regarding the allocation of radio resources to users in an OFDMA system in localized mode (LM)

The following paragraphs will describe various embodiments of the invention. For exemplary purposes only, most of the embodiments are outlined in relation to an UMTS communication system and the terminology used in the subsequent sections mainly relates to the UMTS terminology. However, the terminology and the description of the embodiments with respect to an UMTS architecture is not intended to limit the principles and ideas of the inventions to such systems.

Also the detailed explanations given in the Technical Background section above are intended to better understand the mostly UMTS specific exemplary embodiments described in the following and should not be understood as limiting the invention to the described specific implementations of processes and functions in the mobile communication network. Nevertheless, the improvements proposed herein may be readily applied in the architectures described in the Technological Background section.

Resource Reservation

One main aspect of the invention is to reserve radio resources for a plurality of users in resource block units. For the understanding of the invention it is important to recognize the difference between resource allocation and resource reservation. Resource allocation refers to the assignment of resource units to individual users. Typically the assignment is done on a transmission time interval basis. Hence, a mobile terminal or user being assigned a resource knows that data will be transmitted to it/him/her utilizing the assigned resources.

Resource reservation proposed herein, reserves the resources for the individual users or mobile terminals in a service area. In contrast to the resource assignment by a scheduler, users or mobile terminals that for which a resource is reserved may expect to receive data on the reserved resource, but there is no guarantee that data is provided to the users or mobile terminals on the respective reserved resources. Further, resource reservation is done on a reservation period basis, i.e. on the basis of a plurality of time slots as will explained in more detail below.

Hence, individual resource blocks are reserved for the individual users for a reservation period that comprises a plurality of time slots (or sub-frames). It is further proposed by the invention that the resource block reservations for the users overlap at least partially among the users, i.e. individual ones of the resource blocks are reserved for plural users.

Due to the reservation of resources on a reservation period basis (e.g. instead of a per-transmission time interval basis) the control signaling overhead may be reduced. As has been outlined in the Background Art section in more detail, in a conventional system Layer 1 and Layer 2 control information (DCI/SCI) are transmitted on a transmission interval basis. Due to a more persistent reservation of resources on a reservation period basis, there is no longer a need to transmit control signaling specifying the transmission format and scheduling of resources to the users. Hence, one of the various benefits that may be obtained by employing the invention may be seen in that the user configuration for the persistent reservation on the channel allows for flexible user (re)configuration without requiring a separate control channel structure.

Instead, as will be explained below in more detail, the reservation of resources on a reservation period basis is signaled initially to the users so that no subsequent control signaling is required in principle. This configuration of the users may for example realized by the provision of a configuration message via dedicated connection or via broadcast/multicast transmissions.

Reduction/Avoidance of Control Signaling

In some embodiments of the invention, it may be optionally foreseen to have some control signaling that indicates for which user or users a respective reserved resource block is used. Optionally, the control signaling may (further) indicate the format (transport format) in which the data of different users are multiplexed to a resource block.

Still, also in the embodiments of the invention foreseeing some associated control signaling, the resulting signaling overhead is significantly lower than that implied by the transmission of DCI and SCI in conventional systems.

According to different embodiments of the invention one of or a combination of the following signaling reduction techniques may be applied.

- One option for reducing SCI equivalent information in the control signaling is to address the user with a short ID by limiting the addressing space to the number of users reserved for a given reserved resource block or by limiting the addressing space to the number of users which are "scheduled" in the reservation period mode. Both techniques allow using less bits for the signaling of the user ID. This short user ID may be setup in the configuration message(s).
- In another mechanism for reducing SCI equivalent information, no indication of the resource used for a given user within a reserved resource block is signaled, since the resource may be derived from the ordering of the user ID signaling.
- Concerning the reduction of SCI equivalent information, the signaling of the used transport format may be omitted. The transport format may for example be signaled by the configuration message or may be blindly detected by the receiver,
- In a second technique for reducing SCI equivalent information, there may be a definition of a reduced set of allowed transport formats (e.g. by configuration message of pre-defined), which requires less bits to signal the used transport format. In case of combining this mechanism with blind detection of the transport format, this would also simplify the mobile terminal's operation as less transport formats may be used.
- Another technique to reduce the amount of DCI equivalent information is the signaling of a subset of potentially used transport formats (transport format candidates).
- Further, the signaling of the used modulation scheme could be omitted and may be defined by the configuration message. Thus, the same modulation scheme may be used for transmissions on the system resources reserved for a user/users within a reservation period.
- Moreover, it may also be foreseen to omit or at least to reduce signaling of HARQ related information, since the used HARQ scheme for transmissions utilizing reserved resources may be simpler than that used for transmissions on radio resources assigned on a per transmission time interval.

Choice of the Reservation Period

It should be noted that the reservation period may have a predetermined or configurable length in time. The length of the reservation period may even be defined as a period of infinite length, so that resource reservations are valid for a user staying in a given service area of which he/she uses the reserved resources. The validity of the resource reservation for a particular user may however be ended by an update of the resource reservation of the user, the user moving to another service area (e.g. other serving base station, serving radio network controller, etc.) or similar reasons due to which connectivity to the service area is lost. Hence, the transmission of a further configuration message will typically configure a new resource reservation (or updates same) and will start a new reservation period.

In an advantageous embodiment of the invention, the reservation period is of longer duration than the interval in which users are assigned scheduled resources (in contrast to the reserved resources), the so called transmission time interval. For example the transmission time interval based scheduling may work on a basis of up to a few time slots (e.g. 4 time slots), whereas the reservation periods are on the order of tens, hundreds or thousands of time slots. Hence, in a typical implementation, the transmission time interval is smaller than the reservation period. The advantage of this configuration may be that no or less associated control signaling may need to be transmitted to the users (or at least less frequent than in conventional systems) for reserved resources so that the signaling overhead can be reduced significantly.

Further Improvements

Another optional improvement proposed in another embodiment of the invention is the efficient use of link adaptation mechanisms such as adaptive modulation and coding. In the proposed system, adaptive modulation and coding may be performed on a relatively slow basis, significantly slower than on a per time slot or per transmission time interval basis. For example, the link adaptation for reserved resources may be performed for every reservation period.

Another advantage that may result from employing the improvements described here may be seen in the statistical multiplexing of data between multiple users (having been reserved overlapping resource blocks). The statistical multiplexing of users allows for an efficient utilization of radio resources for a single user. In comparison to a persistent resource reservation for a single user (i.e. no overlapping among assigned resource blocks), where some persistently allocated resources cannot be used due to lack of data, the probability of unused resource blocks may be reduced due to statistical multiplexing of data onto the reserved resource blocks among multiple users.

Resource Allocation (Dynamic Scheduling) Versus Resource Reservation

Another aspect of the invention considers the mapping of codeblocks for transport on the physical resources (resource blocks). In the conventional dynamic scheduling mechanisms on transmission time interval basis it is possible that multiple resource blocks are comprised in a transmission time interval. In this case a single codeblock is mapped so as to span all of the resource blocks of a respective transmission time interval. According to an embodiment of the invention, a reservation period comprises plural time slots, i.e. multiple resource blocks are provided for codeblock transport therein. However, in contrast to conventional dynamic scheduling, when using resource reservation each of the reserved resource blocks transports an individual codeblock according to this embodiment of the invention.

Bringing the concept outlined in the paragraph above to a more abstract level, the reserved resource blocks transporting individual code blocks may more generically be defined as a group of resource blocks (reserved resource element). A reservation period may thus comprise multiple resource elements transporting individual codeblocks. For example, a reserved resource element may span over one or multiple TTIs. In frequency domain a reserved resource element may span multiple (adjacent) physical resource blocks (i.e. multiple subbands) or virtual resource blocks.

Another difference between resource reservation and conventional dynamic resource allocation may be seen in that dynamic resource allocation that all resource blocks assigned to a user in the plural time slots of a transmission time interval are utilized for codeblock transport.

According to a further embodiment of the invention it is possible to perform resource reservation such that only resource blocks in some of the time slots of a reservation period are reserved, which may for example useful for supporting discontinuous transmission/reception (DTX/DRX). For example, the users may be reserved one or more resource blocks in every second, third, . . . time slot. Alternatively, it is also possible to reserve a number of resource blocks in consecutive time slots that are followed by a number of consecutive time slots in which no resource blocks are reserved for the user, again followed by a number of resource blocks in consecutive time slots in which resource blocks are reserved, and so on to support DTX/DRX operation.

Generally, it is of course possible that a user is assigned one or more resource, adjacent or non-adjacent resource blocks in a single time slot and/or one or more resource blocks in each of consecutive time slots.

Channel Structure for Resource Reservation

With respect to the figures discussed in the subsequent sections the following assumptions have been made. It is assumed that the communication system allows for an allocation of resources on a channel on a transmission time interval basis and the reservation of resources on the channel on a per reservation period basis, depending on the scheduler's decision. Hence, some of the users in the service area in which the channel is provided may be scheduled according to a conventional scheme on a transmission time interval basis, while for other users the scheduler may decide to reserve the resources on a reservation period basis.

Since conventional scheduling on a transmission time interval is possible in the illustrative embodiments described with respect to the figures, the channel structure shown in the figures still comprises a control channel (e.g. SCCH) for signaling Layer 1/Layer 2 control information (e.g., SCI) as described in the Technological Background section. However, in most embodiments of the invention this control channel is only used for signaling associated control signaling for users that are scheduled according to conventional schemes on transmission time interval basis. No control signaling associated to the scheduling of users that are subject to resource reservation are signaled on this channel (except for some embodiments of the invention which will explicitly emphasize this feature).

Further, in all of the figures it is assumed for exemplary purposes that in the time domain a transmission time interval TTI comprises one time slot. In case transmission of associated control signaling using TDM (Time Division Multiplexing) is foreseen within a TTI, the available time resource for the data is the duration of the TTI minus the duration of the control channel (see for example FIG. 4 to 13). However, the optional associated control signaling may also be provided using FDM (Frequency Division Multiplexing) or CDM (Code Division Multiplexing) or TDM/FDM (scattered). In these cases, the resources for the control signaling may for example be taken from the system resources (resource blocks) available to the system.

All of these assumptions are only made for exemplary purposes only. For example, in case radio resources are only reserved on a reservation period basis for a channel, i.e. no conventional dynamic scheduling on a transmission time interval is foreseen, there is no need to introduce a control channel. Hence, in this exemplary case a transmission time interval TTI would be equal to N times the length of a time slot (N=1, 2, 3 . . . ).

In another example, only radio resource reservation is used in a system, but there is a control channel foreseen. Further, it may be foreseen that a transmission time interval may also comprise plural time slots, i.e. comprises plural resource blocks in a in the time domain. The control channel may be transmitted for example once every transmission time interval, or once every N time slots (N=1, 2, 3 . . . ).

Hence, the use of a combination of resource assignment and resource reservation, the use of a separate control channel or not, number of resource blocks/time slots in a transmission time interval, etc. is not of essential relevance for the general principles of the proposed resource reservation.

Exemplary Resource Reservation Schemes

The introduction of a resource reservation on a per reservation period basis according to different embodiments of the invention will be explained in more detail. In particular these sections focus on the structure of a downlink channel, for example a shared downlink channel, as proposed in different embodiments of the invention. The proposed reservation of resources may also be referred to as a persistent reservation (in comparison to a resource allocation on a transmission time interval basis).

Figure 4:
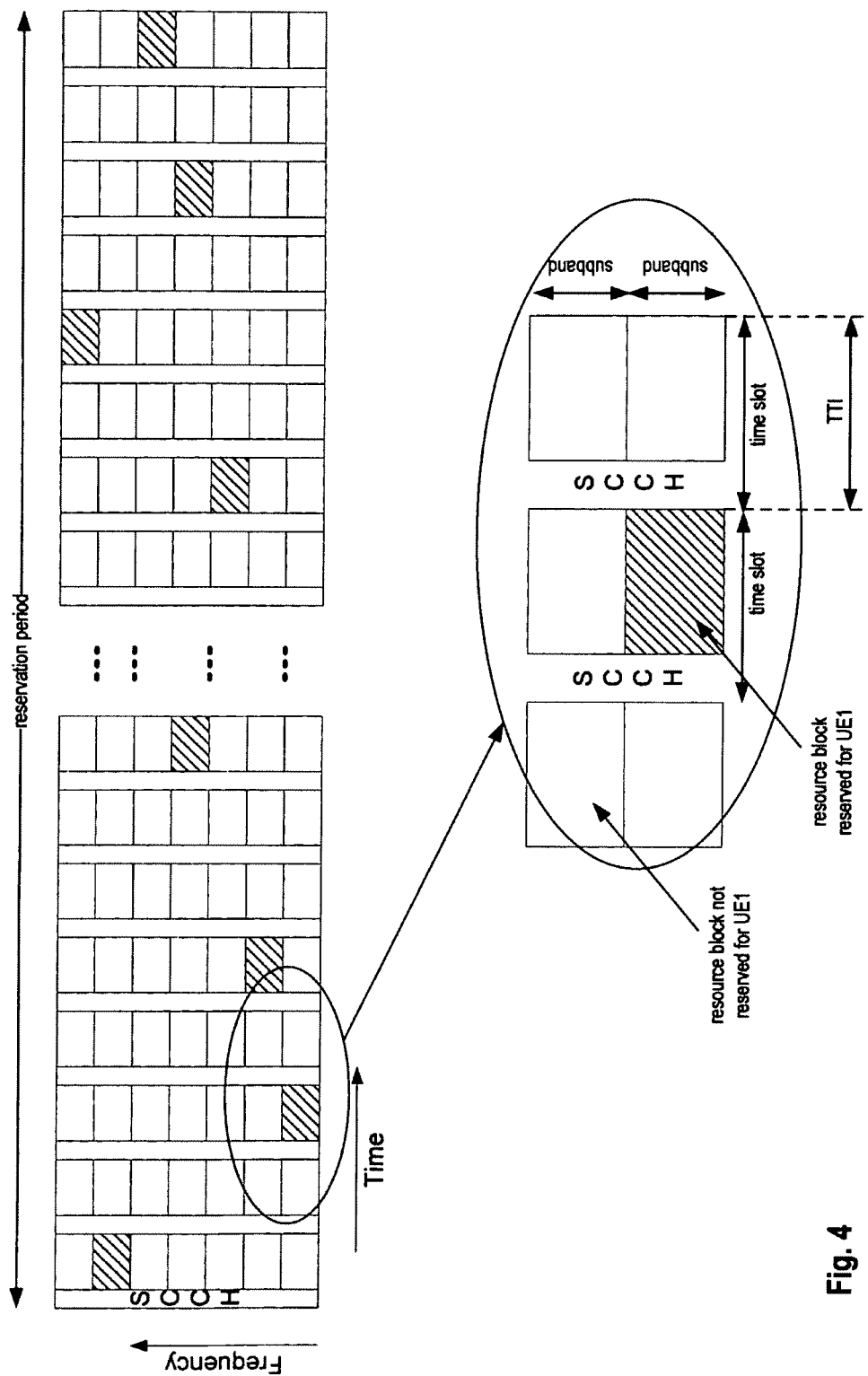
FIG. 4 shows an exemplary channel structure and radio resource reservation on a reservation period basis for a user in time and frequency domain according to an embodiment of the invention.

An exemplary pattern of reserved resources a given user (UE1) according to an illustrative embodiment of the invention is shown in FIG. 4. The resources that are reserved for the user may also be denoted as reserved resource blocks. FIG. 4 shows the reservation of resource blocks to a single user in the time and frequency domain, as for example in an OFDMA system. Generally, the invention is however not limited to its use in OFDMA systems or the like but may also be employed in systems that apportion their air resources in time, frequency and code domain, such as OFCDMA or MC-CDMA systems as discussed in the Technological Background section.

FIG. 4 illustrates the structure of an exemplary channel where resources are reserved and assigned in time and frequency domain in resource block units. The reservation period in which resources are reserved for UE1 spans a plurality of time slots in the time domain. The frequency range available for the channel is split into several portions denoted subbands. Each of the resource blocks is assigned to a frequency band and a time slot.

Further, it is assumed for exemplary purposed that the control channel (e.g. SCCH) for conveying scheduling related control signaling on a TTI basis is provided in a TDM fashion so that in this particular example a portion of the TTI in the time domain is associated to the control channel, while the remaining portion of the TTI is assigned to a time slot. Generally, as noted before, the control channel may also be provided using FDM or TDM/FDM (scattered). Each of the time slots comprises a plurality of resource blocks in the frequency domain.

The channel structure may be easily extended to a third domain, such as the code domain. The individual resource blocks that are reserved in the reservation period have been marked (striped resource blocks).

As has been indicated above, the user (UE1) has been reserved individual resource blocks and may expect to receive data conveyed to him/her in the respective reserved resource blocks. However, there is no guarantee for the user (UE1) that there are data destined to him/her in each respective one of the reserved resource blocks. Therefore, a user may receive all of the reserved resource blocks and subsequently tries to decode the data. In this exemplary "trial and error" scheme, no additional Layer 1/Layer 2 control signaling on an associated control channel is needed.

In this embodiment of the invention, the reserved resource blocks may be reserved for a given or configurable reservation period, as described above. This reservation period may be significantly larger than one time slot or a transmission time interval. Generally, a resource reservation may have a validity of either a limited time period (i.e. the reservation period corresponds to a given or configurable number of consecutive time slots) or the reservation is made for an unlimited time period. In the latter case, it may be assumed that the reservation period is of infinite length in time. However, it may be advantageous that a resource reservation may be cancelled by either an explicit update of the resource reservation withdrawing the previous resource reservation for one or more users, or in an implicit fashion by configuring a new resource reservation.

Although FIG. 4 shows a reserved resource block reservation in localized mode (LM), the reservation may be done also in a distributed mode (DM). In the distributed mode, the definition of the reserved resource blocks on the y-axis (frequency domain) can be viewed in a logical (virtual) domain, where a virtual resource block is defined and a virtual reserved resource block is mapped on parts of multiple physical resource blocks (defined in frequency domain).

In another embodiment of the invention the resource block reservation adheres to the following rules. For a single, such as UE1 indicated in FIG. 4, there may only be one resource block reserved per time slot. Those resource blocks in a single time slot that are not reserved for users are available to "normal scheduling", i.e. the resource blocks are assigned for data transmissions to other users on a per TTI basis.

Moreover, it may be foreseen to avoid the reservation of resource blocks in consecutive time slots for a single user so as to allow for Discontinuous Transmission (DTX) or Discontinuous Reception (DRX) operation, such that mobile stations of the users may enter steep mode between allocated resource blocks/time slots.

For simplicity reasons, the position of the reserved resource blocks may be identical in frequency domain (or following a simple pattern) in each time slot on which they are reserved. Also for simplicity reasons, the reserved resource blocks may be equally spaced in time domain to allow for simple DTX/DRX operation.

Figure 5:
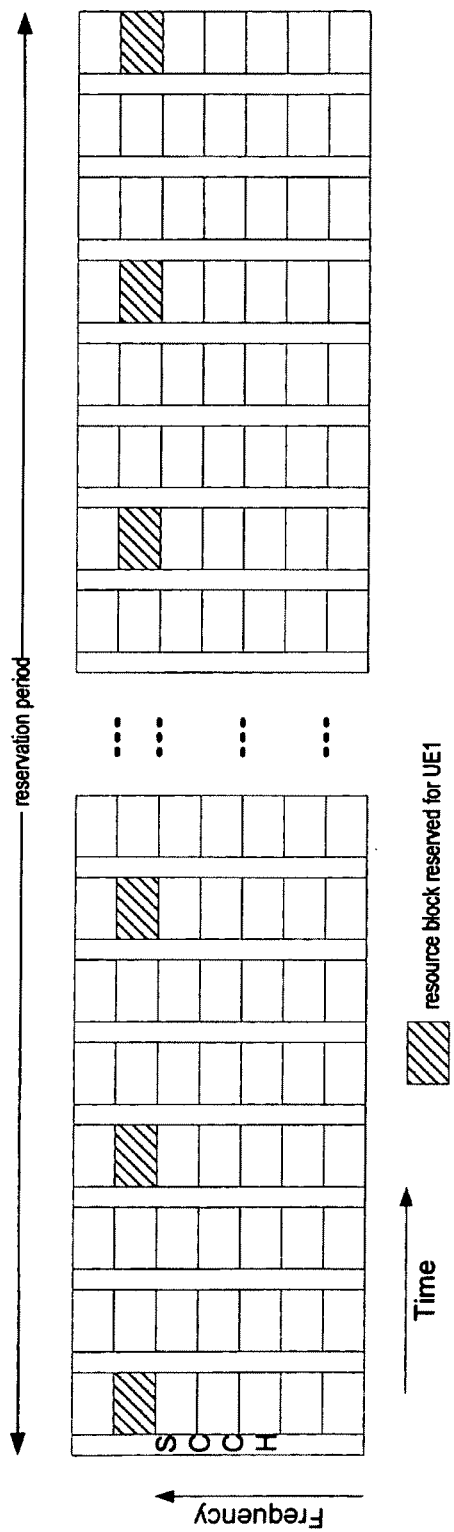
FIGS. 5 & 6 show exemplary channel structures and radio resource reservations on a reservation period basis for a user in time and frequency domain according to different exemplary embodiments of the invention.

Another exemplary pattern of reserved resources assigned to user UE1 according to an illustrative embodiment of the invention is shown in FIG. 5. This reservation pattern obeys the rules defined above. The resource blocks reserved for user UE1 are all located in the same subband in every third time slot.

Figure 6:
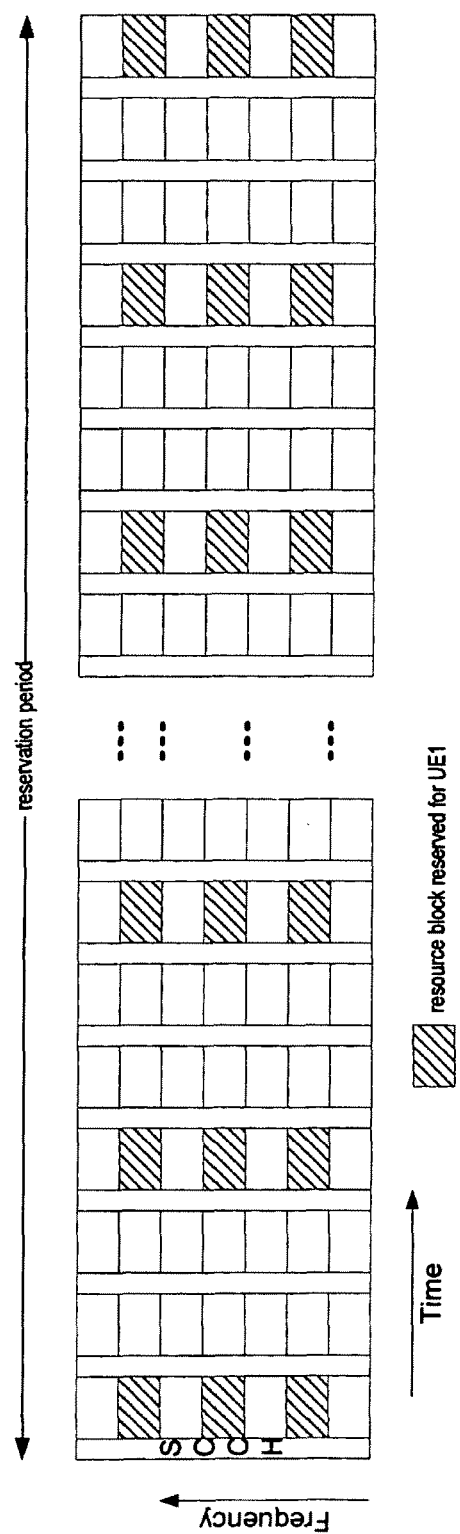

In an alternative embodiment of the invention, multiple reserved resource blocks may be defined within the same time slot for a given user as illustrated in FIG. 6. FIG. 6 shows a further exemplary pattern of reserved resources assigned to user UE1 according to an illustrative embodiment of the invention. Here, three resource blocks on three subbands are reserved for user UE1 in a single time slot. Similar to FIG. 5, the reserved resource blocks are reserved in intervals of three time slots.

When designing the system so that resource reservation is based on reserved resource element, it may be advantageous to use this option in systems where a TTI comprises several time slots. A resource reservation of resource elements in the system according to a further exemplary embodiment of the invention is shown in FIG. 14. As in the other resource reservation patterns illustrated in FIG. 4 to 6, the smallest radio resource units that may be reserved or allocated to the user are resource blocks. In this embodiment, it is assumed that each TTI spans three time slots so that three resource blocks are associated to a respective TTI in the time domain.

In the example of FIG. 14 two users, UE1 and UE2, are reserved resource elements each comprising several resource blocks. Further, the reserved resource elements for the users partially overlap. In this example, the users are reserved a resource element in every second TTI. It is generally also possible a user is reserved resource elements in consecutive TTIs or that several resource elements are reserved within a single TTI for a user.

Coordination of Multiple Users

Figure 7:
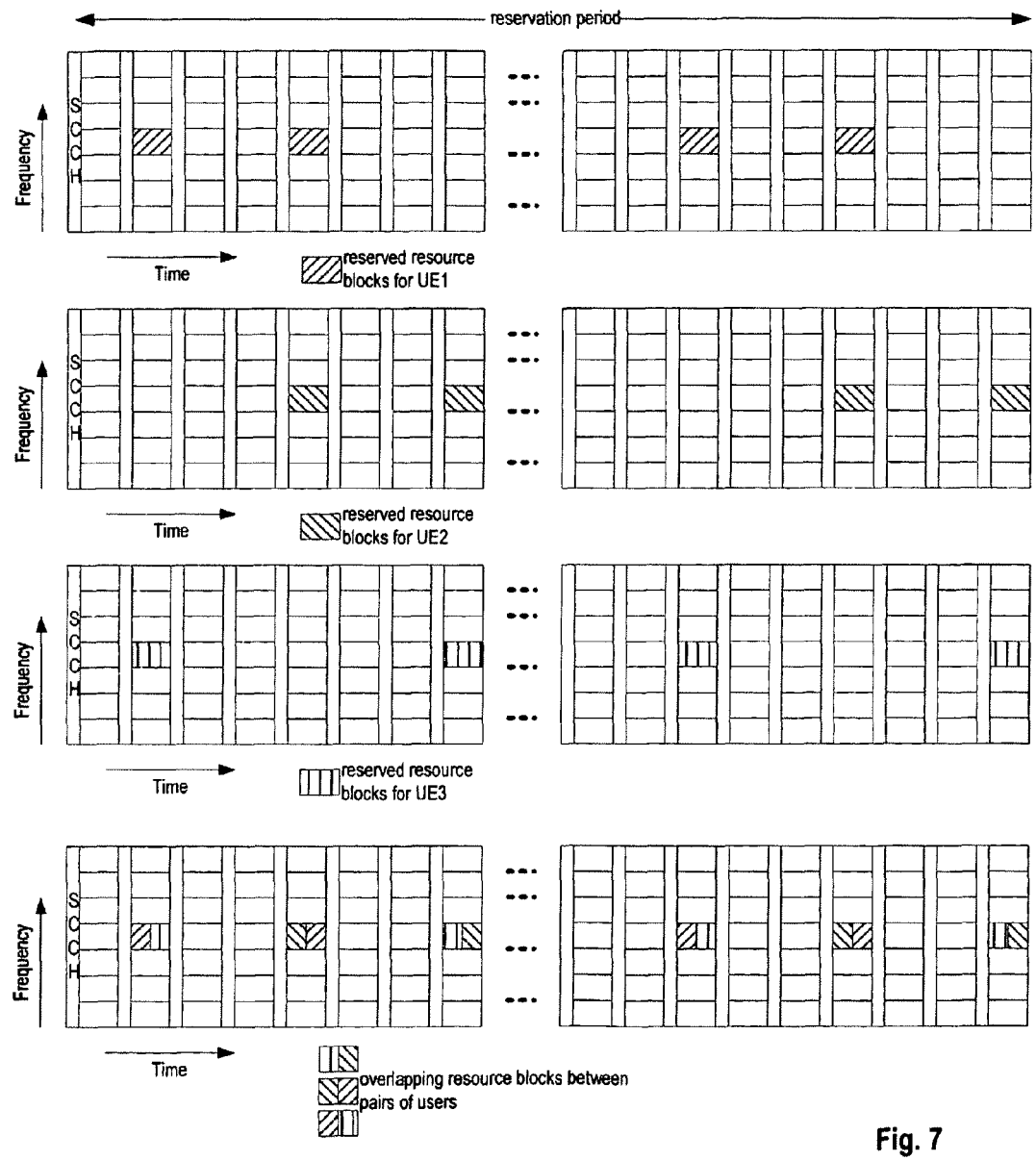
FIG. 7 shows an exemplary radio resource reservation on a reservation period basis for users in time and frequency domain according to an embodiment of the invention, wherein the resources reserved for the users overlap with each other.

As discussed already above, the resource blocks reserved for an individual user may overlap at least partially with the resource blocks reserved for another or other users. An exemplary resource reservation to three users UE1, UE2 and UE3 according to an exemplary embodiment is shown in FIG. 7. In this exemplary pattern, the first resource block that has been reserved to UE1 has also been reserved for UE3. The second resource block reserved for UE1 has been reserved for UE2 as well. Also the second resource block assigned to UE2 and UE3 respectively overlap with each other.

The overlap of reserved resource blocks of multiple users allows for statistical multiplexing of data among users in order to reduce the number of unused reserved resource blocks, for example if there is not sufficient data for transmission in the reserved resource blocks to a given user.

Figure 8:
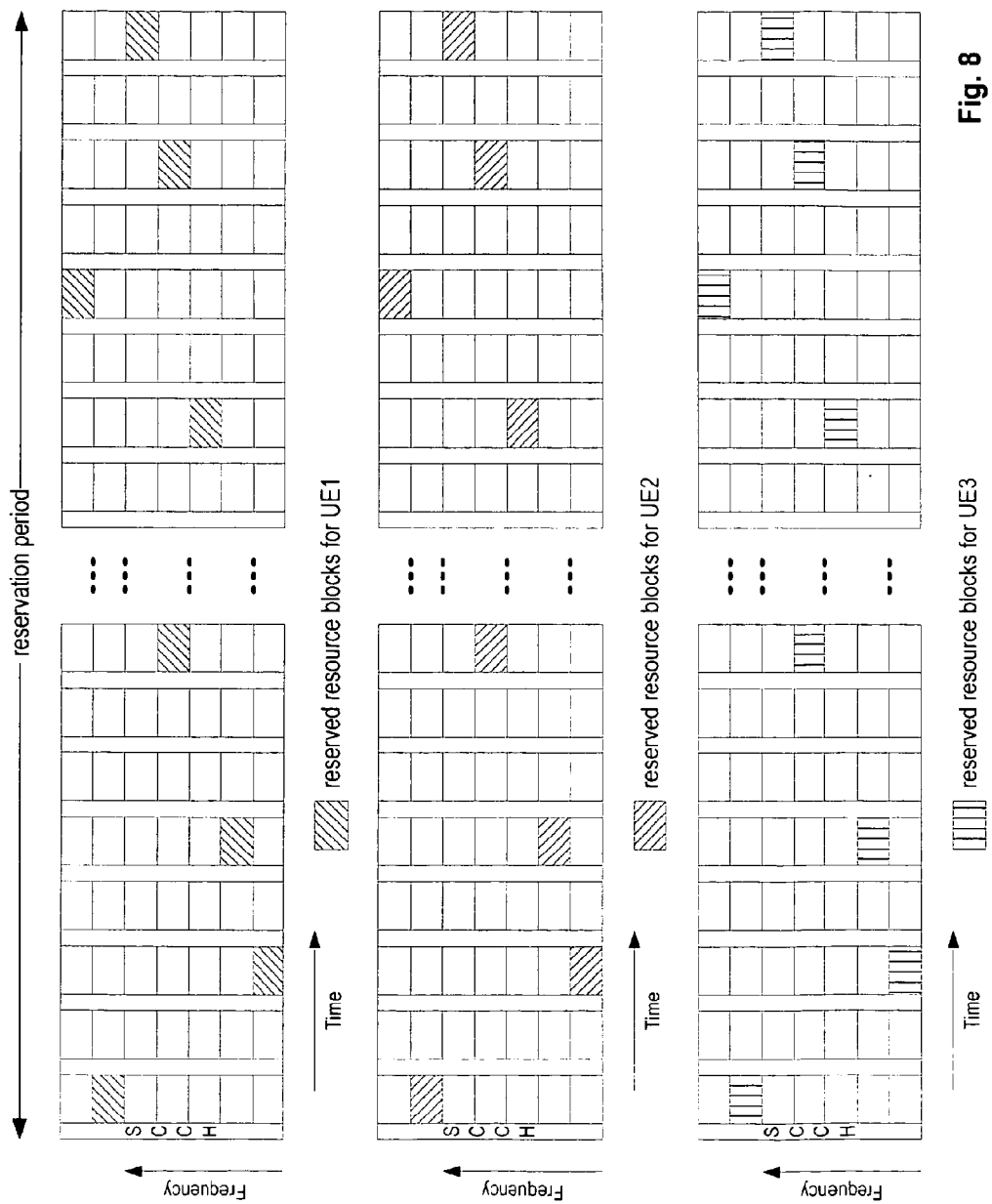
FIG. 8 shows an exemplary radio resource reservation on a reservation period basis for users in time and frequency domain according to an embodiment of the invention, wherein there is a full overlap between the resources reserved for the users.

In FIG. 7 there has been a partial overlap among the reserved resources of the users. In another embodiment of the invention, a full overlap of reserved resource blocks for M users is provided. This exemplary situation is shown in FIG. 8. Therein users UE1, UE2 and UE3 have a reservation for three resource blocks within a single timeslot on three different subbands of the spectrum. The reservations are equally spaced in the time slot.

In case of a full overlap, the users being reserved the same resource blocks may be considered as to form a group (see also signaling details below). Grouping may be done according to user geometries, service types, user type, antenna configuration (MIMO), etc.

The grouping of users may provide several benefits for the system. For example grouping of users may reduce configuration message overhead by enabling joint configuration of multiple users belonging to the same group. Further, the grouping may allow to use short user IDs, as described above, so that the signaling overhead may be further reduced. Other benefits may be for example a more accurate selection of the transport format candidates, when grouping users with the same geometry and a reduced mobile terminal complexity, e.g. by reducing transport format candidates, when grouping users with the same geometry.

Data Transmission and Multiplexing

Generally, on a given reserved resource block, different services and users may be multiplexed. The following cases should be distinguished since required control signaling may be different. In the following schemes it is assumed for exemplary purposes that the reserved resources for the (three) users are configured as shown in FIG. 8.

Multiplexing Scheme 1

Figure 9:
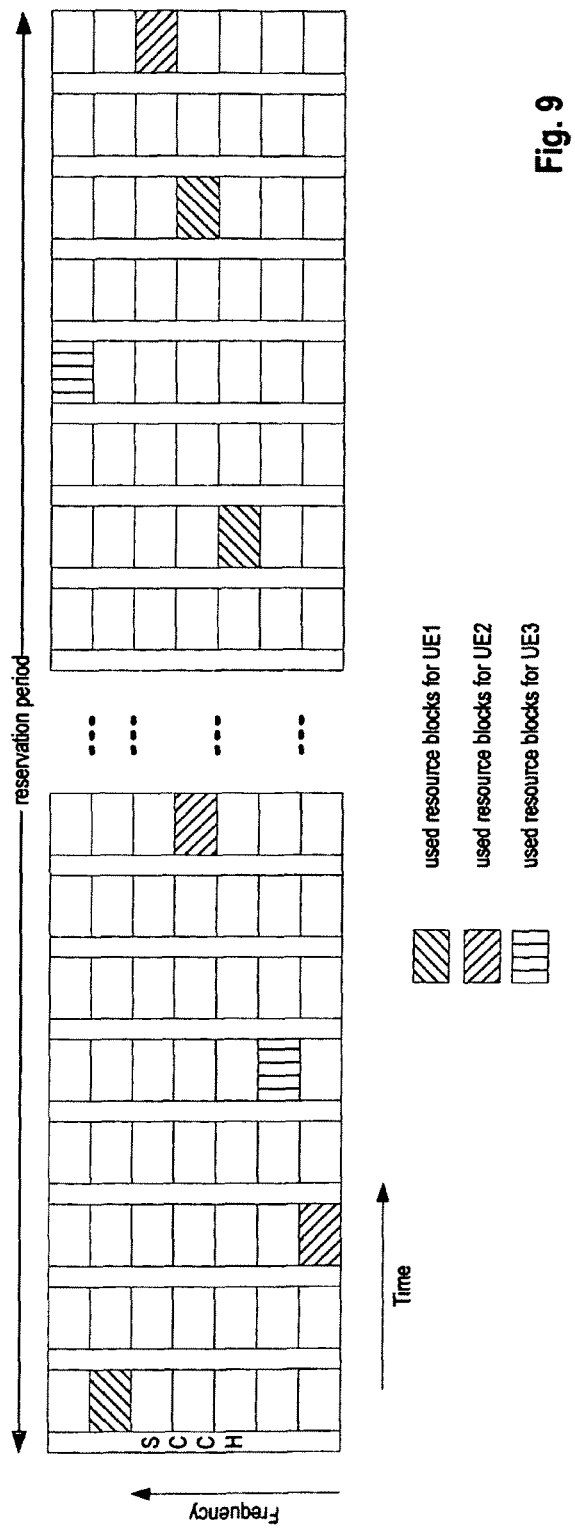
FIGS. 9 & 10 show an exemplary use of the reserved radio resources as shown in FIG. 8 for transmissions to the users according to different embodiments of the invention.

A first "multiplexing scheme" according to an exemplary embodiment of the invention for the transmission of user data to the users that have been reserved overlapping resources is illustrated in FIG. 9. In this potentially simplest case, no user (transport/code block) multiplexing is provided. This means that data for a single user is transmitted in a single transport/code block that is mapped to a single resource block reserved to the user. Multicast to users may be seen as a special case.

Hence, according to this exemplary embodiment of the invention, each reserved resource block will carry the user data of a single user only.

Multiplexing Scheme 2

Figure 10:
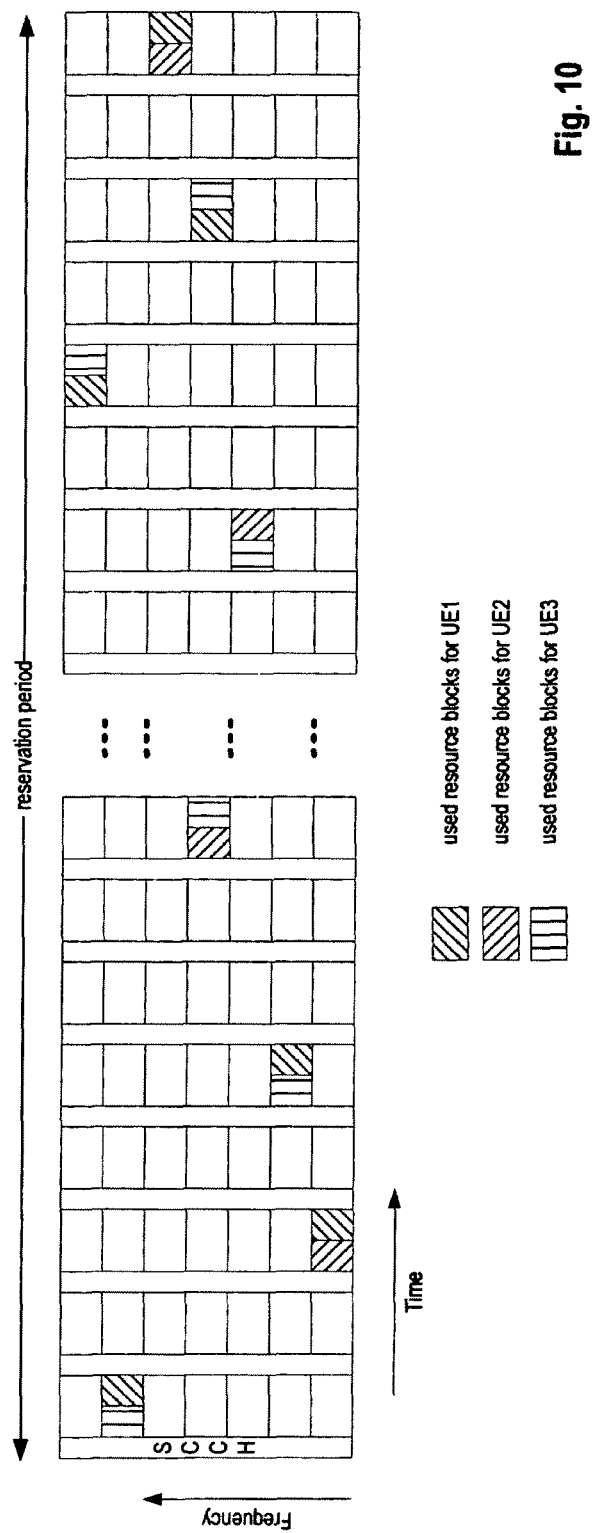

A further multiplexing scheme according to another embodiment of the invention is shown in FIG. 10. In contrast to the first scheme in FIG. 9, user (transport/code block) multiplexing is provided, i.e. data to multiple users is transmitted in multiple transport/code blocks. The multiplexing of the user data may be obtained by TDM, FDM, CDM (scrambling and/or spreading), non-orthogonal superposition (e.g. transmit signals for individual code blocks are simply added at the transmitter). In the example shown in FIG. 10, each resource block carries the user data of two users that have been reserved the resource.

Generally, it would also be possible to multiplex the user data of plural users up to the number of users that have been reserved a respective resource block.

Multiplexing Scheme 3

Another embodiment of the invention suggests utilizing user multiplexing within a code block. Hence, a single code block is transmitted in a reserved resource block that contains data for multiple users. The data may for example be protected by a single CRC for all users or the data parts directed to individual users may be protected individually by user specific masking or be user specific CRCs.

Note that in this context the transmission of an ARQ ACK/NACK, the transmission of the Timing Advance for uplink transmission or other (higher layer) control signaling may be considered as user data in all of the multiplexing scheme suggested above.

Utilization of Reserved Blocks

An exemplary embodiment of the invention relates to the utilization of the reserved resources. For example, there may be a resource reservation provided as shown in FIG. 6. Hence, it is assumed for exemplary purposes that three users are reserved the same resource blocks, i.e. three resource blocks on three subbands are reserved for the user every third time slot.

However, the scheduler in the system may not utilize all of the reserved resources for transmissions to the users. For example, the scheduler may decide the resource utilization based on the amount of data pending for transmission to the users that have been reserved the resources as shown in FIG. 6. If for example not all of the reserved resources need to be utilized for transmission, the scheduler may decide to allocate the unused resource blocks to other users that are scheduled on a transmission time interval. Hence, for example, in each time slot only one out of three reserved resource blocks is actually used for data transmission according to one of the multiplexing schemes described above. Note that generally the number of resource blocks out of the reserved resource blocks actually used for the users that have been reserved the resource may vary from time slot to time slot.

From a system performance point of view this utilization scheme may allow for a more efficient operation of the system, especially when using frequency dependent scheduling (on TTI basis) for the "normally scheduled" data. This is due to e.g. the following reasons:

A resource block which provides a high data rate for a "normally scheduled" user may be blocked by a persistent reservation. The scheduler may decide to use ("steal") the persistently reserved resource block for normal scheduling in order to achieve a higher system throughput.

A persistently reserved resource block may fragment multiple adjacent resource blocks, which should be allocated to a "normally scheduled" user by frequency dependent scheduling. A persistently reserved resource block is stolen in order to have a continuous allocation for the "normally scheduled" user (simplification of signaling and better performance).

Generally, this concept can also be applied in the case only a single reserved resource block is reserved per time slot. In this case no data transmission at all in persistent reservation mode may happen.

Another utilization scheme according to another embodiment of the invention foresees that only a given or configurable number of the resource blocks reserved to users in a single time slot will be used for the transmission to these users, while the remaining reserved resource block(s) in the time slot are to be scheduled on a transmission time interval basis. An exemplary configuration of this implementation is shown for exemplary purposes in FIGS. 11 and 12. As in FIG. 6, three users are reserved the same resource blocks within the reservation period as has been explained above. It may be assumed that the scheduler will only use one out of the three reserved resource blocks per time slot for transmissions to the users, while the third resource block is assigned to another user/users on a transmission time interval basis. In this scheme it may be further foreseen to configure the (fixed) number of used reserved resource blocks utilizing the configuration message.

This utilization scheme may provide the benefit of complexity reduction of the mobile terminal. The receiver may optimize the data reception of the persistently allocated data, since it can stop receiving/decoding data on reserved resource blocks after it has received/decoded data on the fixed number of reserved resource blocks. E.g. in FIG. 10, the receivers (users) would try to decode data on three reserved resource blocks. If decoding in a serial manner, a respective receiver would start sequential decoding of the received data from the reserved resource blocks. As soon as the receiver has received data on one reserved resource block, it would stop decoding additional reserved resource blocks, since the receiver knows that only one out of the three resource blocks in the time slot will contain data destined to it. Note that all receivers being reserved the resource blocks as shown in FIG. 10 may try to decode data on all three reserved resource blocks within a given time slot.

Figure 11:
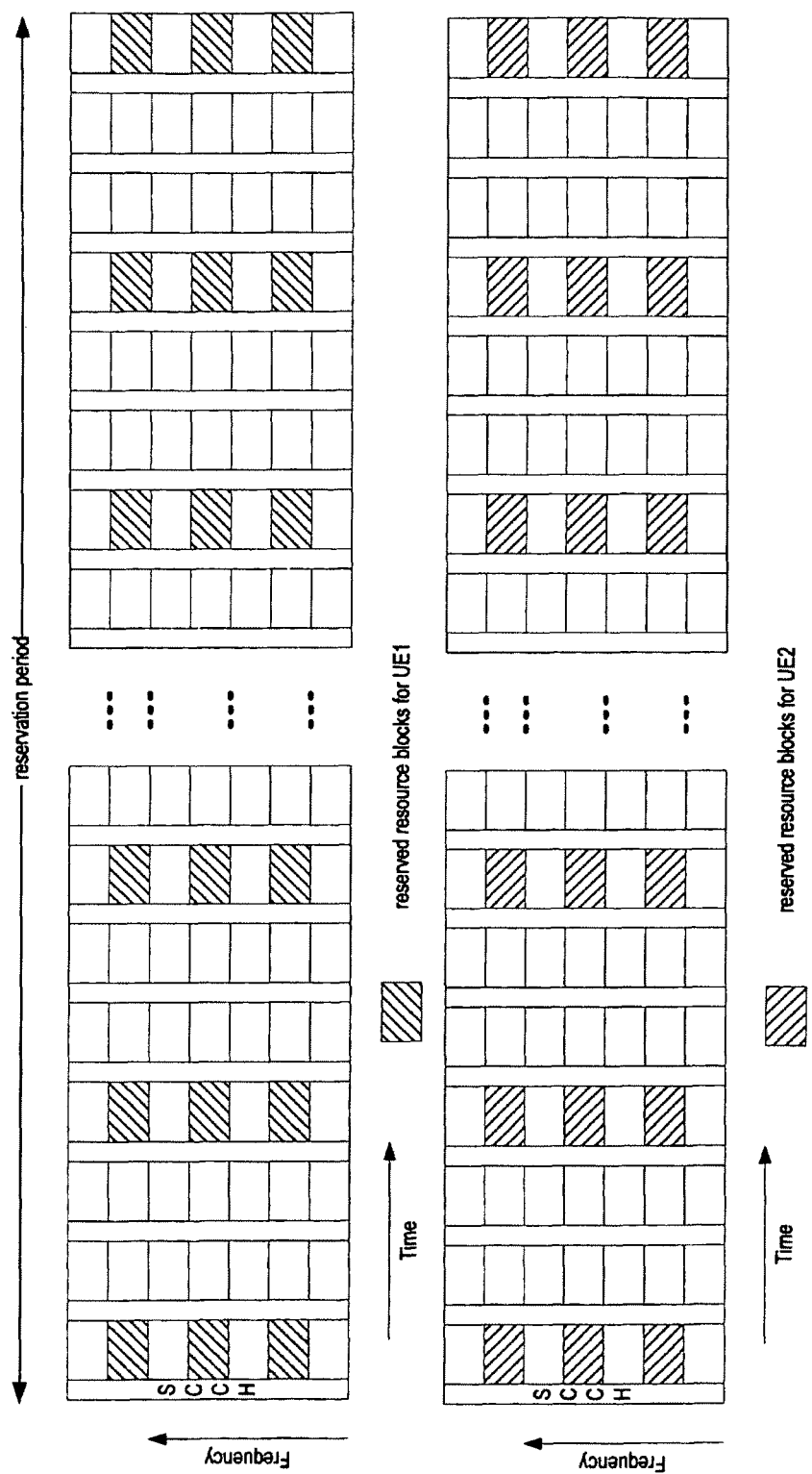
FIG. 11 shows an exemplary radio resource reservation on a reservation period basis for users in time and frequency domain according to an embodiment of the invention, wherein there is a full overlap between the resources reserved for the users.
Figure 12:
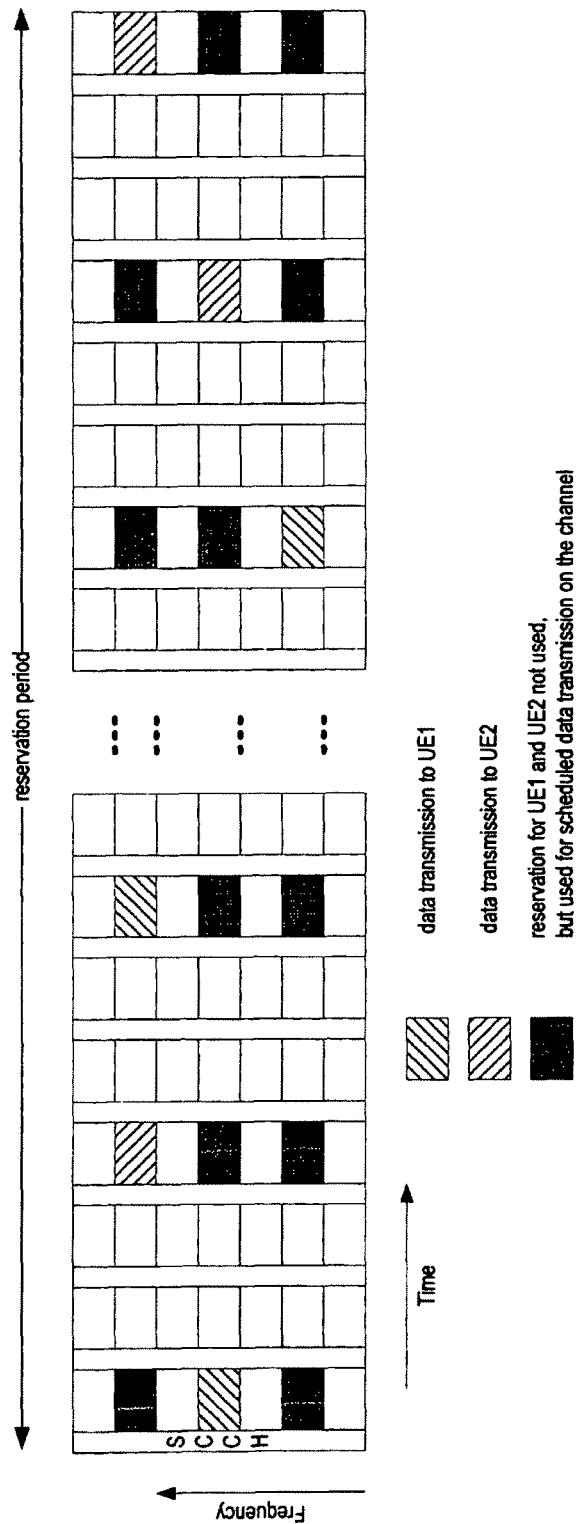
FIG. 12 shows an exemplary use of the reserved radio resources in FIG. 11 according to an embodiment of the invention, wherein only a part of the reserved radio reserved in a time slot is used for transmissions to the users.

The two utilization schemes described above may also be efficiently combined. For example, when assuming the resource reservation as shown in FIG. 11, the scheduler may decide to utilize only one of the three resource blocks per time slot for transmissions to a user/users for which the resource block has been reserved, if there is not sufficient user data pending for transmission. Thus, the scheduler may assign the two remaining reserved resource blocks in the time slot to other users (instead of one remaining reserved resource block) as shown in FIG. 12.

Similarly the two utilization schemes may also be used in implementations where the radio resources are reserved on a resource element basis within a reservation period.

Control Signaling and User Behavior
Configuration of Resource Reservations

The configuration of the resource reservation on a reservation period basis may be done per user according to one of the following principles. The configuration may be achieved by sending a configuration message to the users. This configuration message may be transmitted using system resources that are scheduled on a transmission time interval basis. For example, the configuration message could be transmitted on the SDCH, where it may optionally be combined with RRC (e.g. RRC connection setup) or MAC signaling (RRC=Radio Resource Control, MAC=Medium Access Control).

A new configuration of the reserved resource (i.e. a reconfiguration/update) may utilize a similar mechanism. In this case a configuration message indicating the new configuration of the reserved resources is either transmitted like the initial configuration on conventionally scheduled resources or it is alternatively sent on the already configured reserved resource.

Format of a (Re)Configuration Message

In one embodiment of the invention the configuration message provided to the user(s) includes at least parameters defining the reserved resource blocks (locations) of the user/users. Further, it may also contain the Transport Block Format (MCS), which will be used for the transmission of the data on the persistently reserved resource. Moreover, the message may optionally contain additional information such as temporary (short) user ID, HARQ configuration, CQI feedback configuration, etc.

In case groups of users are defined (compare FIG. 8), the locations of the reserved resource blocks of the groups may alternatively be broadcast/multicast in a cell (service area). Also the Transport Block Format (MCS) may be broadcast/multicast instead of including same in the (re)configuration message.

The (re)configuration message may in this exemplary embodiment of the invention may further indicate to a user the group(s) to which he/she belongs (group ID) and optionally a (short) user ID. In case the Transport Block Format (MCS) has not been informed per group via broadcast/multicast, same may be also contained in the (re)configuration message.

For signaling the locations of the reserved resource blocks to the users, different mechanism may be utilized. According to one embodiment of the invention, a definition of an N element pattern is provided to the user/users that is repeated in time within the reservation period. The number of pattern elements for defining the pattern depends on the complexity thereof.

Concerning for example the reservation pattern of FIG. 4, same may be defined by indicating the starting time slot, the offset between time slots in which a resource block is allocated and parameters to initialize frequency hopping between subbands from time slot to time slot where resources for a user/users are reserved. Hence, the receiver may derive the reserved resource blocks' locations in the reservation period with respect to their respective time slot and subband from the information.

Another option for "encoding" the reservation pattern may be signaling parameters indicating the starting time slot, the offsets in time domain (in units of time slots or TTIs), the position/offset in frequency domain and the size of a reserved resource (in time and/or frequency domain). A further alternative "encoding" of the reservation pattern could be the definition of the starting time slot and location(s) in frequency domain with an offset/periodicity in time domain (assuming that the position in frequency—i.e. the subband(s)—does not change).

As can be seen from the examples above, there are various possibilities how to describe (and signal) the reservation pattern of a reservation period.

Further, considering the reservation of resource elements on a TTI basis, the subbands of the resource blocks and the TTIs in which resources are reserved may be indicated to the user(s). If indicating for example, subbands #i and #j and TTI #n to a user/users, this means that all resource blocks that are either located in subband #i or #j in TTI #n are reserved to the user/users. For example, it may be further defined that the resource reservation is valid for every $m^{th}$ TTI, so that the users expect transmissions on the resource blocks either located in subband #i or #j in the TTIs #n, #n+m, n+2m. #n+3m, . . . in the reservation period.

Control Signaling

Depending on the content in the configuration of the resource reservation and depending on the data multiplexing scheme additional control signaling may be transmitted along with the user data on the persistently reserved resources. This signaling refers to control information, which is required to start decoding the (user) data part of the resource blocks, which implies that the control information should be encoded separately from the user data part(s).

Generally, it is possible that no additional control signaling is transmitted within the persistently reserved resource. Depending on the multiplexing scheme the mobile terminals (receivers) will perform the following operations.

Using multiplexing scheme 1 or 3 as described above, all users, for which the given resource is reserved, will receive the user data carried on a respective reserved resource block and subsequently try to decode this user data block (e.g. transmitted code/transport block).

Similarly, for multiplexing scheme 2, also all users, for which the given resource is reserved, will receive the user data carried on a respective reserved resource block and subsequently try to decode the user data block (e.g. transmitted code/transport blocks). It may be for example advantageous that the multiplexed user data blocks (e.g. code/transport blocks) on a respective resource block are of equal size and use the same modulation scheme, which would allow for the use of a simple demultiplexing scheme at the receiver.

In another embodiment of the invention, control signaling is transmitted together with user data on the persistently reserved resources. Again, the implementation may depend on the multiplexing scheme.

For example, for multiplexing scheme 1 and 3 described above, at least the (short) user ID (control information) is signaled within a resource block and all users, for which the given resource is reserved, receive the respective reserved resource block first and then try to decode the control signaling. Then only the allocated user according to the signaled user ID tries to decode the user data block (e.g. transmitted code/transport block) within the reserved resource block.

For multiplexing scheme 2, at least the (short) user IDs are signaled as control information and all users, for which the given resource is reserved, try to decode the signaling. Then only the allocated users (according to the signaled user Ids) receive the respective reserved resource block first and then try to decode the transmitted user data block (e.g. code/transport blocks). The order of the multiplexed user data blocks is either implicitly given be the user ID signaling (e.g. by the indicated order) or is explicitly signaled. It may be for example advantageous that the multiplexed user data blocks (e.g. code/transport blocks) on a respective resource block are of equal size and use the same modulation scheme, which would allow for the use of a simple demultiplexing scheme at the receiver.

The multiplexing of control signaling and user data (block(s)) within a reserved resource block in TDM fashion according to an exemplary embodiment of the invention is shown in FIG. 13. Generally, any multiplexing scheme may be used, e.g. CDM, FDM, TDM/FDM, etc. for transmitting the control information. As shown in FIG. 13, the first portion (in the time domain) of each resource block provides the control information, while the remaining portion transports the user data for the user/s in block units.

Operation in Combination with HARQ

In some embodiments of the invention a retransmission protocol such as an HARQ (Hybrid Automatic Repeat Request) protocol, is implemented for ensuring successful delivery of user data to the receivers. Depending on the implementation of the resource reservation scheme with or without control signalling as described in the various embodiments of the invention above, the operation in combination with HARQ may an adapted different base station and/or mobile terminal behavior.

For example, if no additional control signaling is transmitted within the persistently reserved resources, and in case a terminal may not decode the data transmitted on reserved resource blocks, there is no possibility for the mobile terminal to recognize whether the data on the resource block has been directed to another user or whether the data has been directed to the terminal, but it could not successfully decode the data (e.g. SNR to low). One possibility to solve this problem is that the MS stores the received data and tries various combination possibilities in a blind detection fashion. A mechanism for blind detection for use in this embodiment of the invention is for example specified in 3GPP TSG-RAN WG1 #44 R1-060450, "Further details on HS-SCCH-less operation for VoIP traffic", February 2006 and 3GPP TSG-RAN WG1 #44bis R1-060944 "Further Evaluation of HS-SCCH-less operation", March 2006 (available at http://www.3gpp.org) incorporated herein by reference.

This solution is trading off control signaling overhead vs. mobile terminal complexity. The mobile terminal complexity could be reduced by e.g. the following restrictions on the scheduler flexibility. For example, the scheduler may ensure that the initial transmissions of user data blocks of a HARQ channel to a certain mobile terminal are only allowed in selected/configured reserved resource blocks and/or time slots (e.g. every $n^{th}$ reserved time slot). Further, it may be additionally foreseen to use a synchronous HARQ scheme. Moreover, the maximum number of retransmissions may be further restricted to a small value, e.g. 1 or 2.

In case of using multiplexing scheme 2, the retransmissions may for example be mapped onto the identical resource within a reserved resource block as the initial transmission in a subsequent time slot.

If there is additional control signaling transmitted within the persistently reserved resource, the mobile terminal may read the control information and knows if user data in a reserved resource block is destined to the terminal or not. Therefore, the HARQ operation is straightforward and a mobile terminal can store a unsuccessfully decoded packet and may combine same with later retransmissions. Optionally, only one HARQ channel (process) may be used on the reserved resources for a mobile terminal is used.

Another embodiment of the invention suggests that a resource reservation for a reservation period is setup for a mobile terminal as soon as its user becomes active. Hence, the resource reservation may be performed for the terminal together with activation from LTE_IDLE to LTE_ACTIVE. If a user enters a cell (handover), a previous reservation may be maintained during LTE_IDLE state.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for reserving radio resources in radio resource block units in a mobile communication system for a plurality of users, the method comprising:
   associating each resource block to a portion of an available frequency resource in a frequency domain and to a time slot in a time domain,
   reserving resource blocks for the plurality of users for downlink data transmission to the users for a reservation period comprising a plurality of consecutive time slots, wherein at least one resource block reserved for an individual one of the plurality of users is also reserved for another user,
   transmitting from a transmitting entity a downlink configuration message indicating which of the plurality of resource blocks is reserved for which user or users of the plurality of users, wherein the reserved resource blocks for a respective user within a given reservation period are indicated by way of a reservation pattern in at least the time domain and the frequency domain, and
   scheduling downlink transmissions to users, including the plurality of users, on a per transmission time interval basis, wherein the scheduling includes deciding whether or not to allocate a resource block reserved for the user to said user.

2. The method according to claim 1, wherein a plurality of resource blocks is reserved for a user within a time slot of the reservation period.

3. The method according to claim 1 or 2, wherein at least one resource block in each of a number of consecutive time slots is reserved for a user.

4. The method according to claim 1 or 2, wherein distinct time slots in which resource blocks are reserved for a user are spaced by at least one time slot in which no resource block is reserved for this user.

5. The method according to claim 1, wherein the reservation of resource blocks is valid for a given or configurable number of consecutive time slots forming the reservation period.

6. The method according to claim 5, wherein the reservation of resource blocks is valid for a given or configurable time period or until a respective user receives a configuration message updating the reservation of resource blocks.

7. The method according to claim 1, further comprising transmitting a configuration message indicating the reservation pattern in at least the time and frequency domain.

8. The method according to claim 7, wherein the configuration message is transmitted through a dedicated channel, a broadcast channel or a multicast channel.

9. The method according to claim 1 or 2, wherein a part of available radio resources is reserved for the plurality of users on a reservation period basis and a remaining part of the radio resources is assigned to users scheduled on a transmission time interval basis.

10. The method according to claim 1 or 2, further comprising assigning unscheduled resources of the resource block to another user on a per transmission time interval basis, if no data are scheduled for transmission within a resource block reserved for at least one user of said plurality of users for a reservation period.

11. The method according to claim 1 or 2, further comprising scheduling a user on a transmission time interval basis, wherein the scheduling assigns at least one resource block having been reserved for at least one other user to said user.

12. The method according to claim 1 or 2, wherein multiple resource blocks in a time slot are reserved for least one user of the plurality of user, and wherein only a given or configurable maximum number of said multiple reserved resource blocks in the time slot are used for downlink data transmission to the at least one user.

13. The method according to claim 12, further comprising scheduling at least one other user on a transmission time interval basis thereby assigning a remaining number of reserved resource blocks in the time slot to said at least one other user.

14. The method according to claim 1 or 2, further comprising transmitting user data to a single user in a resource block having been reserved for multiple users.

15. The method according to claim 1 or 2, further comprising transmitting, in a resource block, user data to at least one of multiple users for which the resource block has been reserved.

16. The method according to claim 1 or 2, wherein each resource block is further associated to a code in a code domain.

17. The method according to claim 1, wherein reserved resource blocks within a reservation period form a reservation pattern in the time, code and frequency domain.

18. The method according to claim 1 or 2, wherein the resource blocks reserved for a first user and the resource blocks reserved for a second user of the plurality of users are identical.

* * * * *